US012732092B2

(12) United States Patent
Tanaka et al.

(10) Patent No.: US 12,732,092 B2
(45) Date of Patent: Sep. 8, 2026

(54) CIRCULATING CURRENT CONTROL FOR A MODULAR MULTILEVEL CONVERTER

(71) Applicants: Mitsubishi Electric Corporation, Tokyo (JP); TOSHIBA MITSUBISHI-ELECTRIC INDUSTRIAL SYSTEMS CORPORATION, Tokyo (JP)

(72) Inventors: Miwako Tanaka, Tokyo (JP); Kaho Mukunoki, Tokyo (JP); Toshiyuki Fujii, Tokyo (JP); Takeshi Kikuchi, Tokyo (JP); Tomohiko Tatsumi, Tokyo (JP); Takashi Sugiyama, Tokyo (JP); Ryota Okuyama, Tokyo (JP)

(73) Assignees: Mitsubishi Electric Corporation, Tokyo (JP); Toshiba Mitsubishi-Electric Industrial Systems Corporal, Tokyo (JP)

( * ) Notice: Subject to any disclaimer, the term of this patent is extended or adjusted under 35 U.S.C. 154(b) by 264 days.

(21) Appl. No.: 18/561,526

(22) PCT Filed: Jun. 10, 2021

(86) PCT No.: PCT/JP2021/022120

§ 371 (c)(1), (2) Date: Nov. 16, 2023

(87) PCT Pub. No.: WO2022/259465

PCT Pub. Date: Dec. 15, 2022

(65) Prior Publication Data

US 2024/0250603 A1 Jul. 25, 2024

(51) Int. Cl.

| | |
|---|---|
| ***H02M 7/483*** | (2007.01) |
| ***H02M 1/12*** | (2006.01) |
| *H02J 3/36* | (2006.01) |

(52) U.S. Cl.

CPC .......... *H02M 1/12* (2013.01); *H02M 7/4833* (2021.05); *H02J 3/36* (2013.01)

(58) Field of Classification Search

CPC .......................... H02M 7/4833; H02M 7/4835

See application file for complete search history.

(56) References Cited

U.S. PATENT DOCUMENTS

2014/0003101 A1* 1/2014 Tang .................. H02M 7/4835 363/40

2016/0329831 A1 11/2016 Mukunoki et al.

(Continued)

FOREIGN PATENT DOCUMENTS

JP 6768993 B1 10/2020

WO 2015102060 A1 7/2015

(Continued)

OTHER PUBLICATIONS

Extended European Search Report dated Jul. 9, 2024, issued in the corresponding European Patent Application No. 21945139.0, 13 pages.

(Continued)

*Primary Examiner* — Peter M Novak

(74) *Attorney, Agent, or Firm* — .Buchanan Ingersoll & Rooney PC

(57) ABSTRACT

A power conversion unit includes a plurality of arms each having a plurality of converter cells connected to each other in cascade. A converter control unit that controls the power conversion unit includes a voltage command value computing unit to compute an output voltage command value for each arm, and a gate signal generating unit to generate an on/off control signal of each switching element of each converter cell in accordance with the output voltage command value. A voltage command value computing unit is configured to generate the output voltage command value with compensation for an AC vibration component, (Continued)

extracted for each arm, of stored energy of power storage elements of a plurality of converter cells included in the arm.

8 Claims, 11 Drawing Sheets

(56) References Cited

U.S. PATENT DOCUMENTS

2016/0336874 A1 11/2016 Kikuchi et al.
2017/0054294 A1* 2/2017 Lyu .................... H02M 7/4835
2022/0393616 A1 12/2022 Fujiwara et al.

FOREIGN PATENT DOCUMENTS

WO 2015104922 A1 7/2015
WO 2020136699 A1 7/2020

OTHER PUBLICATIONS

International Search Report (PCT/ISA/210) with translation and Written Opinion (PCT/ISA/237) mailed on Aug. 24, 2021, by the Japan Patent Office as the International Searching Authority for International Application No. PCT/JP2021/022120. (9 pages).

* cited by examiner

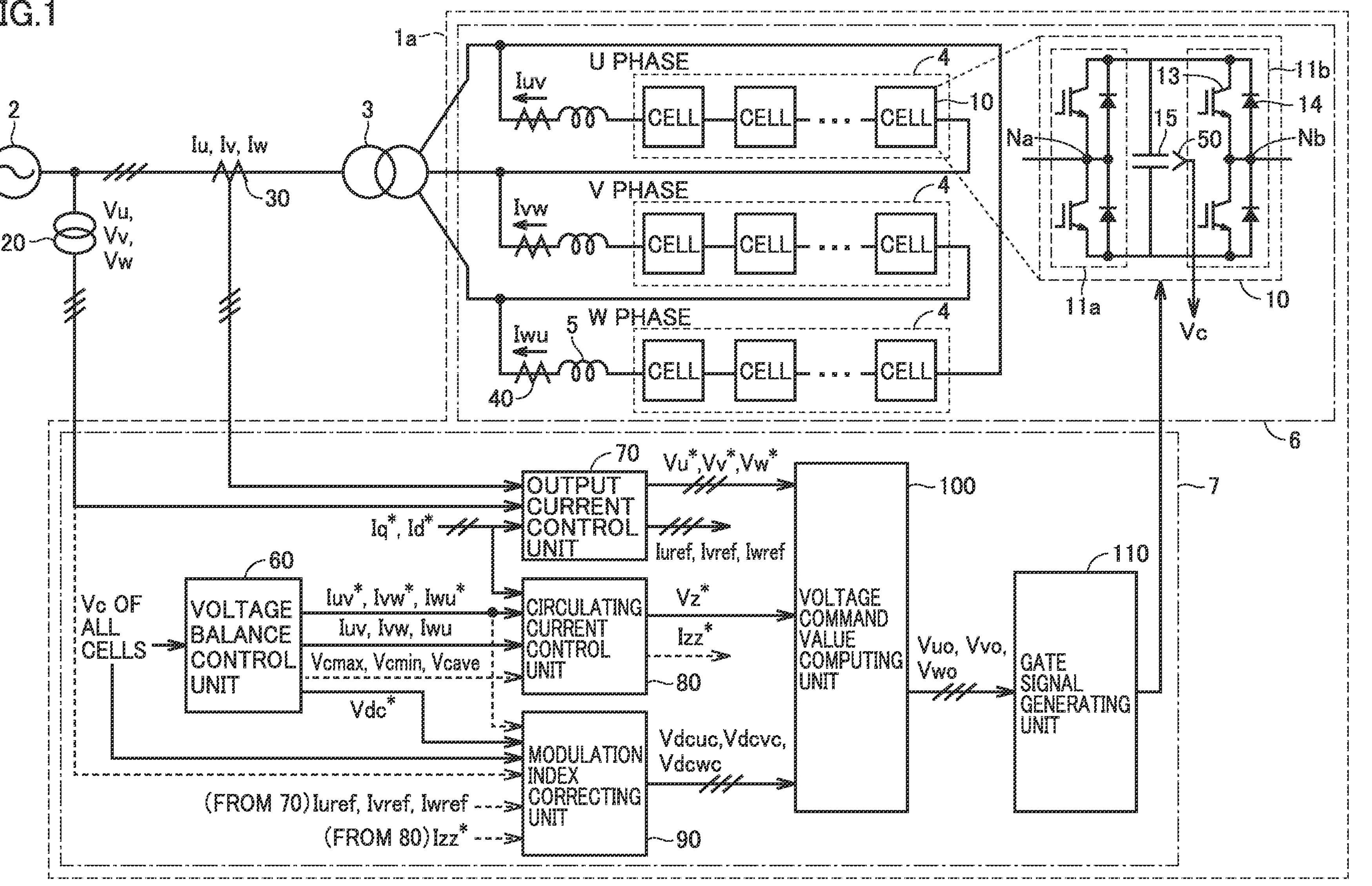
FIG.1
2
20
Vu, Vv, Vw
Iu, Iv, Iw
30
3
1a
6
U PHASE
V PHASE
W PHASE
Iuv
Ivw
Iwu
5
40
4
CELL
10
11a
11b
13
14
15
50
Na
Nb
Vc
7
VOLTAGE BALANCE CONTROL UNIT
60
Vc OF ALL CELLS
Iuv*, Ivw*, Iwu*
Iuv, Ivw, Iwu
Vcmax, Vcmin, Vcave
Vdc*
Iq*, Id*
OUTPUT CURRENT CONTROL UNIT
70
CIRCULATING CURRENT CONTROL UNIT
80
MODULATION INDEX CORRECTING UNIT
90
(FROM 70) Iuref, Ivref, Iwref
(FROM 80) Izz*
Vu*, Vv*, Vw*
Iuref, Ivref, Iwref
Vz*
Izz*
Vdcuc, Vdcvc, Vdcwc
VOLTAGE COMMAND VALUE COMPUTING UNIT
100
Vuo, Vvo, Vwo
GATE SIGNAL GENERATING UNIT
110

Vdc*
Vcmax, Vcmin, Vcave, Vcmed
Vc OF ALL CELLS
VOLTAGE COMMAND VALUE CALCULATING UNIT
61
Vdc*
62
EACH PHASE VOLTAGE REPRESENTATIVE VALUE CALCULATING UNIT
63
FREQUENCY FILTER
64
DEVIATION COMPUTING UNIT
Vdcu
Vdcv
Vdcw
65
ARM CURRENT COMMAND VALUE CALCULATING UNIT
60
Iuv*, Ivw*, Iwu*
ΔVdcu
ΔVdcv
ΔVdcw 90
Vu, Vv, Vw
Iuv*, Ivw*, Iwu*
Iuref, Ivref, Iwref
Vdc*
Vu
Vv
Vw
Iuv*
Ivw*
Iwu*
Iuref
Ivref
Iwref
96
ARM VOLTAGE ESTIMATING UNIT
Vue
Vve
Vwe
97
×
92
Pue
Pve
Pwe
93
FILTER (MOVING AVERAGE FILTER)
94
+
−
98
1
Ts
ΔPue
ΔPve
ΔPwe
1.0 (p.u.)
+
−
95b
95c
×
Vdc*
Vdcuc
Vdcvc
Vdcwc 80
Iuv*, Ivw*, Iwu*
81
CIRCULATING CURRENT COMMAND VALUE COMPUTING UNIT
Iz*
Izzero*
(Vc IMBALANCE AMOUNT)
Vcvrt
Vlzon
86a
"1" WHEN A>B
COMPARATOR
A
B
Idrbase
Id*
86b
"1" WHEN A>B
COMPARATOR
A
B
87
FLG
88
×
Izzero
89
+
+
Izz*
83
+
−
85
CONTROL COMPUTING UNIT (PI)
Vz*
Iu, Iv, Iw
82
CIRCULATING CURRENT CALCULATING UNIT
Iz

Vu, Vv, Vw (EACH PHASE)
Ipu, Ipv, Ipw, Inu, Inv, Inw (EACH ARM)
Iuref, Ivref, Iwref (EACH PHASE)
Vdcc*
290
Vu Vv Vw
Vdc*
Ipu, Inu Ipv, Inv Ipw, Inw
Iuref Ivref Iwref
296
ARM VOLTAGE ESTIMATING UNIT
Vupe Vvpe Vwpe Vune Vvne Vwne
297
Pupe Pvpe Pwpe Pune Pvne Pwne
292
293
FILTER (MOVING AVERAGE FILTER)
294
298
1/Ts
Δ Pupe Δ Pvpe Δ Pwpe Δ Pune Δ Pvne Δ Pwne
1.0 (p.u.)
295b
295c
Vdcc*
Vdcupc Vdcvpc Vdcwpc Vdcunc Vdcvnc Vdcwnc

CIRCULATING CURRENT CONTROL FOR A MODULAR MULTILEVEL CONVERTER

CROSS-REFERENCE TO RELATED APPLICATIONS

This application is a U.S. National Phase application of International Application No. PCT/JP2021/022120, filed Jun. 10, 2021, the entirety of which is incorporated by reference herein.

TECHNICAL FIELD

The present disclosure relates to a power conversion device.

BACKGROUND ART

A modular multilevel converter (MMC) is known as a power conversion device that is suitable for high voltage applications and does not require multiple transformers. A three-phase MMC has a configuration including a plurality of converter cells connected in cascade and a reactor further connected in series, in each of three phases. The three-phase configuration is connected in parallel with an AC power grid through a reactor or a transformer.

In the three-phase MMC, therefore, there are two current components, namely, current that flows through the AC grid and between the phases and current that is not output toward the AC grid but circulates in the connection inside the MMC. Furthermore, a power storage element (typically, capacitor) is independently disposed in each converter cell, and variation in capacitor voltage, that is, stored energy of the capacitor causes increase of harmonic current flowing to the AC grid side.

WO 2015/104922 (PTL 1) describes a power conversion device capable of stable and reliable control even when inductance components on a positive-side arm and a negative-side arm of the MMC differ. In the power conversion device in PTL 1, even when inductance components on a positive-side arm and a negative-side arm differ, stable and reliable control is possible by determining a positive-side arm voltage command and a negative-side arm voltage command by subtracting a voltage drop due to an inductance component in each arm from each of voltages born by the positive-side arm and the negative-side arm.

PTL 1 further discloses that the positive-side arm voltage command and the negative-side arm voltage command are divided by a modulation index correcting signal based on a voltage of a DC capacitor in a converter cell, and used as command values of pulse width modulation (PWM) control.

CITATION LIST

Patent Literature

PTL 1: WO 2015/104922

SUMMARY OF INVENTION

Technical Problem

In the power conversion device in PTL 1, the modulation index correcting signal that reflects a capacitor voltage can be expected to alleviate variations in capacitor voltage, that is, stored energy of a capacitor that is a cause of harmonic current. However, since harmonic current has a large component of a specific frequency, more specifically, one time or two times the grid frequency, the technique in PTL 1 may fail to sufficiently suppress the harmonic current with the certain frequency component.

The present disclosure is made to solve such a problem and an object of the present disclosure is to effectively suppress harmonic current of a power conversion device.

Solution to Problem

According to an aspect of the present disclosure, a power conversion device connected to an AC power grid includes a power conversion unit and a converter control unit to control the power conversion unit. The power conversion unit includes a plurality of arms each having a plurality of converter cells connected to each other in cascade. Each of the converter cells includes a pair of input/output terminals, a plurality of switching elements, and a power storage element electrically connected to the input/output terminals through the switching elements. The converter control unit includes a voltage command value computing unit and a gate signal generating unit. The voltage command value computing unit computes an output voltage command value for each of the arms. The gate signal generating unit generates an on/off control signal of each of the switching elements of each of the converter cells of each arm in accordance with the output voltage command value. The voltage command value computing unit is configured to generate the output voltage command value with compensation for an AC oscillation component, extracted for each arm, of stored energy of the power storage elements of the converter cells included in the arm.

Advantageous Effects of Invention

According to the present disclosure, an AC oscillation component of a predetermined frequency of stored energy of the power storage elements in the converter cells for each arm is extracted, and the output voltage command value of the converter cells in each arm can be generated to compensate for the AC oscillation component. Therefore, harmonic current output from the power conversion device can be suppressed by increasing the effect of suppressing oscillation in the predetermined frequency component of stored energy of the power storage elements.

BRIEF DESCRIPTION OF DRAWINGS

FIG. 1 is a block diagram illustrating a configuration of a power conversion device according to a first embodiment.

FIG. 10 is a block diagram illustrating an internal configuration example of a voltage balance control unit in FIG. 9.

FIG. 11 is a block diagram illustrating an internal configuration example of a modulation index correcting unit in FIG. 9.

DESCRIPTION OF EMBODIMENTS

Figures 2, 3:
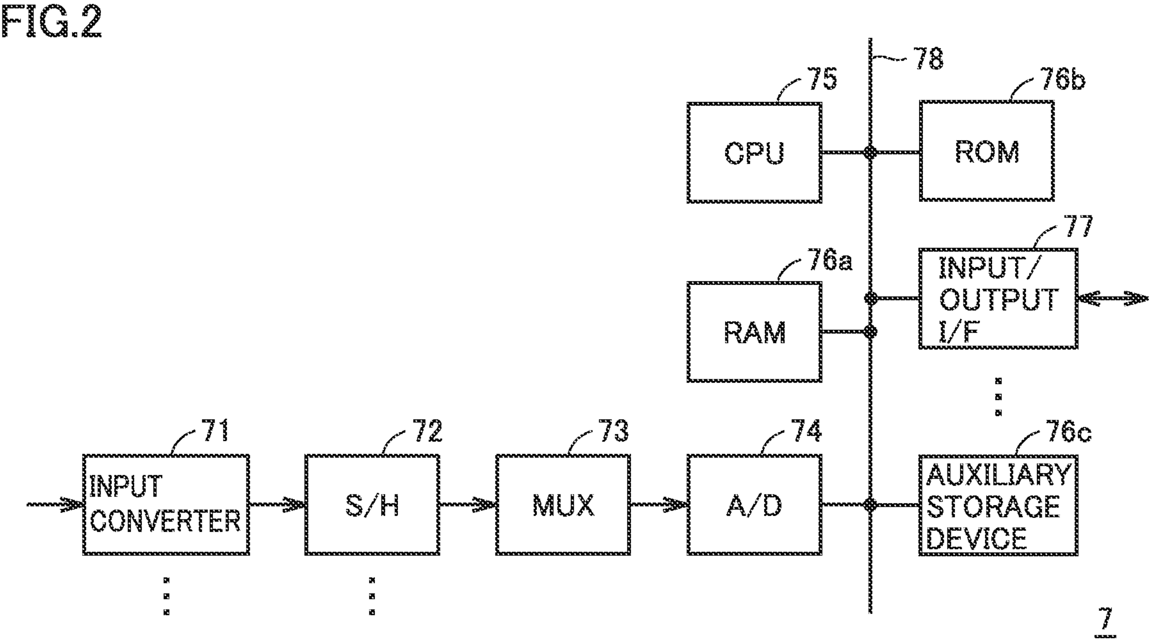
FIG. 2 is a functional block diagram illustrating a hardware configuration example of a converter control unit in FIG. 1.
FIG. 3 is a block diagram illustrating an internal configuration example of a voltage balance control unit in FIG. 1.

Embodiments of the present disclosure will be described in detail below with reference to the drawings. In the following, like or corresponding parts in the drawings are denoted by like reference signs and a description thereof is basically not repeated.

First Embodiment

FIG. 1 shows a block diagram illustrating a configuration of a power conversion device 1*a* according to a first embodiment.

As shown in FIG. 1, power conversion device 1*a* having three phase arms in delta connection is connected in parallel with a three phase AC power grid 2 through a three phase interconnection transformer 3 to form a power system. Power conversion device 1*a* and AC power grid 2 may be connected through a not-shown interconnection reactor instead of interconnection transformer 3.

Power conversion device 1*a* includes a power conversion unit 6 and a converter control unit 7. Power conversion unit 6 has an arm 4 in each of U phase, V phase, and W phase. Each arm 4 is configured such that N (N is a natural number equal to or greater than 2) converter cells 10 connected in cascade and an arm reactor 5 are connected in series. In power conversion device 1*a*, arms 4 of individual phases are mutually connected in delta connection. As described above, a connection end of arm 4 of each phase is connected to AC power grid 2 through a "reactor component" such as interconnection transformer 3.

Arm reactor 5 is inserted to suppress circulating current that passes through two or more arms 4 and circulates in power conversion unit 6. Arm reactor 5 can be disposed at any location as long as it is connected in series with converter cells 10, and a plurality of arm reactors 5 may be inserted in a distributed manner.

In the example in FIG. 1, each converter cell 10 is a full bridge configuration. Specifically, each converter cell 10 is configured such that two series units 11*a* and 11*b* and a DC capacitor 15, which is a typical example of "power storage element", are connected in parallel. Each of series units 11*a* and 11*b* is configured such that two self-turn-off switching elements 13, to each of which a diode element 14 is connected in anti-parallel, are connected in series. Converter cell 10 is connected to another converter cell 10, arm reactor 5, or interconnection transformer 3 through a connection node Na of switching elements 13 in series unit 11*a* and a connection node Nb of switching elements 13 in series unit 11*b* as "a pair of input/output terminals".

Converter cell 10 in full bridge configuration allows four switching elements 13 to turn on/off to selectively output one of Vc, −Vc, and zero voltage (0) between connection nodes Na and Nb, using voltage Vc of DC capacitor 15. Converter cell 10 is not limited to full bridge configuration described as an example, and any circuit configuration such as half bridge configuration may be employed as desired.

Power conversion unit 6 further includes an arm current detecting unit 40 disposed corresponding to arm 4 of each phase and a DC capacitor voltage detecting unit 50 disposed in each converter cell 10. Arm current detecting unit 40 detects arm current Iuv, Ivw, Iwu passing through arm 4 of the corresponding phase. DC capacitor voltage detecting unit 50 detects a voltage of DC capacitor 15 (hereinafter capacitor voltage Vc) for each converter cell 10.

For AC power grid 2, an AC voltage detecting unit 20 that detects three phase grid AC voltages Vu, Vv, Vw and an output current detecting unit 30 that detects three phase AC output currents Iu, Iv, Iw of AC power grid 2 are disposed. Detection values by AC voltage detecting unit 20 and output current detecting unit 30 are input to converter control unit 7.

Converter control unit 7 controls power conversion unit 6 in accordance with an operation command value by controlling on/off of each switching element 13 of each converter cell 10. In FIG. 1, converter control unit 7 is shown in a functional block diagram as a group of control functions and includes a voltage balance control unit 60, an output current control unit 70, a circulating current control unit 80, a modulation index correcting unit 90, a voltage command value computing unit 100, and a gate signal generating unit 110.

In summary, output current control unit 70 generates phase voltage command values Vu*, Vv*, Vw* for controlling an output current of power conversion unit 6, in accordance with an active current command value Id* and a reactive current command value Iq* of power conversion device 1*a*. Voltage balance control unit 60 generates arm current command values Iuv*, Ivw*, Iwu* for balancing capacitor voltages Vc of converter cells 10 between phases. Circulating current control unit 80 generates a zero phase voltage command value Vz* for controlling circulating current, based on the arm current command value of each phase from voltage balance control unit 60. Modulation index correcting unit 90 computes modulation index correction signals Vdcuc, Vdcvc, Vdcwc of output voltage command values. Voltage command value computing unit 100 computes output voltage command values Vuo, Vvo, Vwo of converter cells 10 of individual phases with modulation index correction by modulation index correction signals Vdcuc, Vdcvc, Vdcwc from modulation index correcting unit 90. Gate signal generating unit 110 generates a gate signal for controlling on/off of each switching element 13 of each converter cell 10 of each arm 4 by PWM control, in accordance with output voltage command values Vuo, Vvo, Vwo from voltage command value computing unit 100. The gate signal from gate signal generating unit 110 is input to each switching element 13 of the corresponding converter cell 10.

FIG. 2 shows a hardware configuration example of converter control unit 7. FIG. 2 shows an example in which converter control unit 7 is configured with a computer.

Converter control unit 7 includes one or more input converters 71, one or more sample and hold (S/H) circuits 72, a multiplexer (MUX) 73, and an analog/digital (A/D) converter 74. Converter control unit 7 further includes one or more central processing units (CPU) 75, a random access memory (RAM) 76*a*, and a read only memory (ROM) 76*b*. Converter control unit 7 further includes an auxiliary storage device 76*c*, one or more input/output interfaces 77, and a bus 78 connecting the components above to each other.

Input converter 71 has an auxiliary transformer (not shown) for each input channel. Each auxiliary transformer converts a detection signal by AC voltage detecting unit 20, output current detecting unit 30, arm current detecting unit 40, and DC capacitor voltage detecting unit 50 in FIG. 1 into a signal with a voltage level suitable for the subsequent signal processing.

Sample and hold circuit 72 is provided for each input converter 71. Sample and hold circuit 72 samples a signal representing the electrical quantity received from the corresponding input converter 71 at a preset sampling frequency and holds the signal.

Multiplexer 73 successively selects the signals held by a plurality of sample and hold circuits 72. A/D converter 74 converts a signal selected by multiplexer 73 into a digital value. A plurality of A/D converters 74 may be provided to perform A/D conversion of detection signals of a plurality of input channels in parallel.

CPU 75 controls the entire converter control unit 7 and performs computational processing under instructions of a program. RAM 76*a* as a volatile memory and ROM 76*b* as a nonvolatile memory are used as a main memory of CPU 75. ROM 76*b* stores a program and setting values for signal processing. Auxiliary storage device 76*c* is a nonvolatile memory having a larger capacity than ROM 76*b* and stores a program and data such as electrical quantity detection values. Input/output interface 77 is an interface circuit for communication between CPU 75 and an external device (not shown).

Unlike the example of FIG. 2, at least a part of converter control unit 7 may be configured using circuitry such as a field programmable gate array (FPGA) and an application specific integrated circuit (ASIC). More specifically, the functions of the blocks included in converter control unit 7 illustrated in FIG. 1 may be configured based on the computer illustrated in FIG. 2 or may be at least partially configured using circuitry such as an FPGA and an ASIC. The functions of the blocks may be at least partially configured with an analog circuit.

Referring to FIG. 1 again, the functions of converter control unit 7 will be further described.

Output current control unit 70 performs power control of power conversion unit 6 by controlling active current Iq and reactive current Id. Output current control unit 70 receives grid AC voltages Vu, Vv, Vw and AC output currents Iu, Iv, Iw detected by AC voltage detecting unit 20 and output current detecting unit 30, and active current command value Iq* and reactive current command value Id*. Active current command value Iq* and reactive current command value Id* are predetermined based on the operating conditions of power conversion device 1*a*.

Active current Iq and reactive current Id can be obtained from AC output currents Iu, Iv, Iw by three phase/two phase conversion as indicated by the following equation (1). Phase θ in equation (1) is a phase synchronized with a grid AC voltage.

$$\begin{bmatrix} Id \\ Iq \end{bmatrix} = \frac{2}{3}\begin{bmatrix} \cos\theta & \cos\left(\theta - \frac{2}{3}\pi\right) & \cos\left(\theta - \frac{4}{3}\pi\right) \\ -\sin\theta & -\sin\left(\theta - \frac{2}{3}\pi\right) & -\sin\left(\theta - \frac{4}{3}\pi\right) \end{bmatrix}\begin{bmatrix} Iu \\ Iv \\ Iw \end{bmatrix} \quad (1)$$

An inverse matrix of the matrix in equation (1) can be used to determine AC output currents Iu, Iv, Iw from active current Iq and reactive current Id by two phase/three phase conversion.

In output current control unit 70, voltage command values Vd*, Vq* on the dq axis are computed by performing feedback control such that active current Iq and reactive current Id determined by three phase/two phase conversion according to equation (1) from detection values of AC output currents Iu, Iv, Iw follow active current command value Iq* and reactive current command value Id*.

Further, three phase voltage command values Vu*, Vv*, Vw* are calculated by two phase/three phase conversion of voltage command values Vd*, Vq on the dq axis. Similarly, three phase output current command values Iuref, Ivref, Iwref are calculated by two phase/three phase conversion of current command values Id*, Iq* on the dq axis. Output current control unit 70 outputs voltage command values Vu*, Vv*, Vw* and output current command values Iuref, Ivref, Iwref of individual phases. It is understood that voltage command values Vu*, Vv*, Vw* and output current command values Iuref, Ivref, Iwref are sinusoidal.

Voltage balance control unit 60 receives capacitor voltages Vc of all converter cells 10 of power conversion unit 6 detected by DC capacitor voltage detecting units 50.

FIG. 3 shows an internal configuration example of voltage balance control unit 60.

As shown in FIG. 3, voltage balance control unit 60 includes a voltage command value computing unit 61, an each phase voltage representative value calculating unit 62, a frequency filter 63, a deviation computing unit 64, and an arm current command value calculating unit 65.

Voltage command value computing unit 61 calculates a voltage command value Vdc* for voltage balance control, from a representative voltage value Vdcall of capacitor voltages Vc of all converter cells 10 (Vdc*=Vdcall). For example, an average value (Vcave), a median value (Vcmed), a maximum value (Vcmax), or a minimum value (Vcmin) of capacitor voltages Vc of all converter cells 10 can be used as representative voltage value Vdcall of all converter cells 10. Alternatively, voltage command value Vdc* may be a predetermined constant according to the rated value or the like.

Each phase voltage representative value calculating unit 62 calculates representative voltage values Vdcu, Vdcv, Vdcw of capacitor voltages Vc for DC capacitors 15 of N converter cells 10 of U phase, V phase, and W phase. As described above, an average value, a median value, a maximum value, or a minimum value of capacitor voltages Vc of N converter cells 10 of the same phase can also be used for representative voltage values Vdcu, Vdcv, Vdcw.

Capacitor voltage Vc includes a DC component and an AC variation component. The AC variation component mainly includes a frequency component of an integer multiple of the grid frequency (for example, 50 [Hz] or 60 [Hz]) of AC power grid 2. For example, when the power conversion device performs DC-AC power conversion, oscillation of the same frequency component (1*f*) as the grid frequency occurs in stored energy of DC capacitor 15 due to DC voltage×AC voltage, or AC voltage×DC current. Variation of stored energy occurs as variation of capacitor voltage Vc. Further, oscillation of a frequency twice the grid frequency occurs in voltage of each arm due to power pulsation of AC voltage×AC current.

In power conversion device 1*a* having three phase arms 4 connected in parallel with AC power grid 2, a frequency component (2*f*) twice the grid frequency tends to be included in capacitor voltage Vc of converter cell 10 due to power pulsation for each arm 4. Therefore, a frequency component of an integer multiple of the grid frequency, such as 2*f*, is also included in the above representative voltage values Vdcu, Vdcv, Vdcw. Frequency filter 63 is configured to remove an oscillation component of an integer multiple (typically, 2*f*) of the grid frequency from representative voltage values Vdcu, Vdcv, Vdcw.

Deviation computing unit 64 calculates voltage deviations ΔVdcu, ΔVdcv, ΔVdcw between representative voltage values Vdcu, Vdcv, Vdcw of individual phases from which an oscillation component has been removed by frequency filter 63 and voltage command values Vdc* from voltage command value computing unit 61 (ΔVdcu=Vdc*−Vdcu, ΔVdcv=Vdc*−Vdcv, ΔVdcw=Vdc*−Vdcw).

Arm current command value calculating unit 65 computes respective arm current command values Iuv*, Ivw*, Iwu* of three phase arms 4 for controlling voltage deviations ΔVdcu, ΔVdcv, ΔVdcw to zero. For example, arm current command values Iuv*, Ivw*, Iwu* can be computed by PI (proportional integral) control computation.

As shown in FIG. 1, circulating current control unit 80 receives arm current command values Iuv*, Ivw*, Iwu* of individual phases output from voltage balance control unit 60 and arm currents Iuv, Ivw, Iwu of individual phases detected by arm current detecting unit 40.

Circulating current control unit 80 calculates circulating current command value Iz* in accordance with the following equation (2), using arm current command values Iuv*, Ivw*, Iwu* of individual phases.

$$Iz^* = (Iuv^* + Ivw^* + Iwu^*)/3 \tag{2}$$

Further, circulating current control unit 80 calculates circulating current Iz in accordance with the following equation (3), using the detected arm currents Iuv, Ivw, Iwu of individual phases.

$$Iz = (Iuv + Ivw + Iwu)/3 \tag{3}$$

Circulating current control unit 80 outputs zero phase voltage command value Vz* for controlling such that the calculated circulating current Iz follows circulating current command value Iz* by PI computation or the like.

Figure 4:
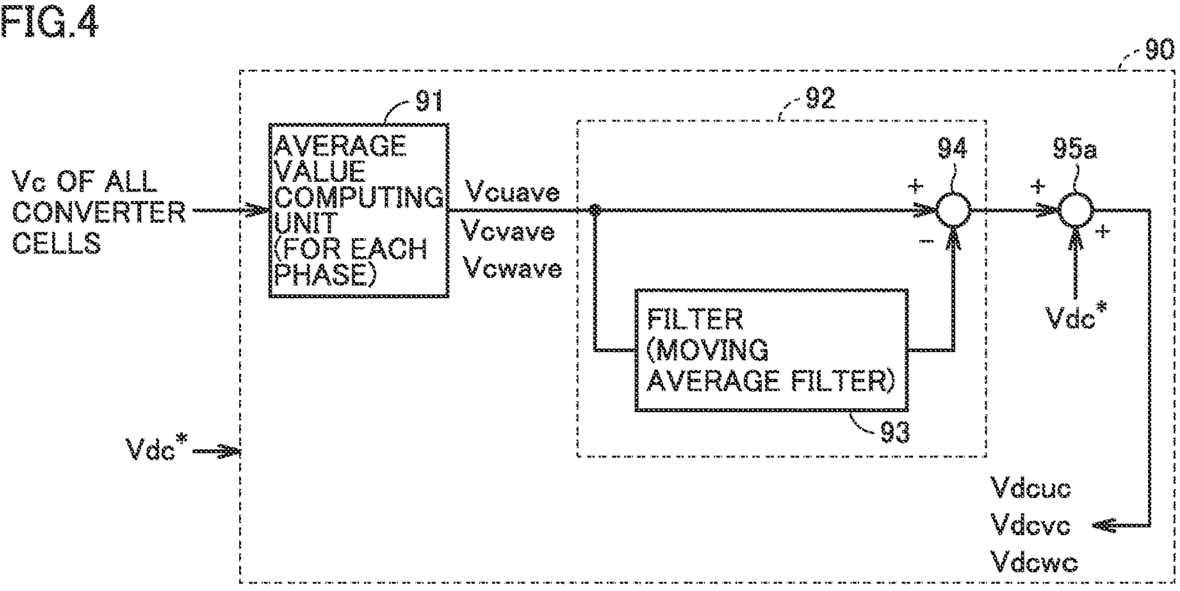
FIG. 4 is a block diagram illustrating an internal configuration example of a modulation index correcting unit in FIG. 1.

Modulation index correcting unit 90 receives capacitor voltages Vc of all converter cells 10 of power conversion unit 6 and voltage command value Vdc* from voltage balance control unit 60 (voltage command value computing unit 61). FIG. 4 shows an internal configuration example of modulation index correcting unit 90.

As shown in FIG. 4, modulation index correcting unit 90 includes an average value computing unit 91, a frequency filter 92, and an adder 95*a*.

Average value computing unit 91 computes an average value of capacitor voltages Vc of DC capacitors 15 of N converter cells 10 for each arm 4. Average value computing unit 91 calculates respective capacitor voltage average values Vcuave, Vcvave, Vcwave of U phase, V phase, and W phase. For example, capacitor voltage average value Vcuave of U phase can be determined by the following equation (4) using capacitor voltages Vc(k) (k=1 to N) of N DC capacitors 15 of N converter cells 10 included in arm 4 of U phase. Capacitor voltage average values Vcvave, Vcwave of V phase and W phase can also be determined from capacitor voltages Vc(k) of N converter cells 10 of each phase. For capacitor voltage average values Vcvave, Vcvave, Vcwave, those determined by each phase voltage representative value calculating unit 62 in FIG. 3 may be used in modulation index correcting unit 90.

$$Vcuave = \left(\sum_{k=1}^{N} Vck\right)/N \tag{4}$$

As described above, each capacitor voltage Vc includes an AC oscillation component typified by a frequency of an integer multiple (1*f*, 2*f*, etc.) of the grid frequency. Therefore, frequency filter 92 is configured to extract the AC oscillation component of the frequency from capacitor voltage average values Vcuave, Vcvave, Vcwave. Frequency filter 92 can be composed of, for example, a moving average filter 93 and a subtractor 94.

Moving average filter 93 calculates respective moving average values in one period indicated by the reciprocal of the grid frequency, for capacitor voltage average values Vcuave, Vcvave, Vcwave of U phase, V phase, and W phase. Thus, moving average filter 93 can extract DC components of capacitor voltage average values Vcuave, Vcvave, Vcwave from which a frequency component of an integer multiple of the grid frequency has been removed.

Alternatively, moving average filter 93 may be replaced by a notch filter (not shown) configured to remove a frequency component (for example, 1*f* and 2*f* components) of an integer multiple of the grid frequency. Frequency filter 63 (voltage balance control unit 60) in FIG. 3 can also be configured with the above moving average filter 93 or a notch filter.

Subtractor 94 subtracts respective output values (DC components) from moving average filter 93 for U phase, V phase, and W phase from capacitor voltage average values Vcuave, Vcvave, Vcwave calculated by average value computing unit 91. Thus, oscillation components of the frequency of an integer multiple of the grid frequency that are extracted from capacitor voltage average values Vcuave, Vcvave, Vcwave are output from subtractor 94. In this way, frequency filter 92 can extract AC oscillation components of a predetermined frequency from temporal changes of capacitor voltage average values Vcuave, Vcvave, Vcwave. More specifically, the AC oscillation component includes an oscillation component of an integer multiple of the grid frequency.

Adder 95*a* outputs respective modulation index correction signals Vdcuc, Vdcvc, Vdcvw of U phase, V phase, and W phase by adding AC oscillation components of capacitor voltage average values Vcuave, Vcvave, Vcwave extracted by frequency filter 92 to voltage command value Vdc*.

As shown in FIG. 1, voltage command value computing unit 100 receives sinusoidal voltage command values Vu*, Vv*, Vw* of individual phases output from output current control unit 70, zero phase voltage command value Vz* output from circulating current control unit 80, and modulation index correction signals Vdcuc, Vdcvc, Vdcwc of individual phases output from modulation index correcting unit 90. Voltage command values Vu*, Vv*, Vw* of individual phases correspond to an example of "first voltage command value", and zero phase voltage command value Vz* corresponds to an example of "second voltage command value".

Using these input values, voltage command value computing unit 100 calculates output voltage command values Vuo, Vvo, Vwo of converter cells 10 in arms 4 of individual phases, by computation of the following equations (5) to (7).

$$Vuo = (Vu^* + Vz^*)/Vdcuc \tag{5}$$

$$Vvo = (Vv^* + Vz^*)/Vdcvc \tag{6}$$

$$Vwo = (Vw^* + Vz^*)/Vdcwc \tag{7}$$

As understood from FIG. 4, for example, if capacitor voltage Vc (average value) varies in the increasing direction in a certain arm 4, modulation index correction signal Vdcuc, Vdcvc, Vdcwc is set to be higher than voltage command value Vdc*, whereby output voltage command value Vuo, Vvo, Vwo of the arm 4 decreases. Thus, capacitor voltage Vc of converter cell 10 in the arm 4 can be changed in the decreasing direction. Conversely, if capacitor voltage Vc (average value) varies in the decreasing direction, modulation index correction signal Vdcuc, Vdcvc, Vdcwc is set to be lower than voltage command value Vdc*, thereby changing capacitor voltage Vc in the increasing direction. In other words, modulation index correction signals Vdcuc, Vdcvc, Vdcwc can be generated to compensate for an AC oscillation component of capacitor voltage Vc, that is, an AC oscillation component of stored energy of capacitor 15.

In this way, output voltage command values Vuo, Vvo, Vwo can be calculated with compensation for an oscillation component of stored energy of DC capacitor 15 by performing division by modulation index correction signals Vdcuc, Vdcvc, Vdcwc having the same frequency component as the AC oscillation component (an integer multiple of the grid frequency) of capacitor voltage Vc, in accordance with equations (5) to (7).

Gate signal generating unit 110 computes output voltage command values Vuo*, Vvo*, Vwo* of individual converter cells 10, based on output voltage command values Vuo, Vvo, Vwo of individual phases output from voltage command value computing unit 100. Further, gate signal generating unit 110 generates a gate signal for controlling on/off drive of switching element 13 of each converter cell 10 by performing PWM control based on output voltage command values Vuo*, Vvo*, Vwo*.

Figure 5:
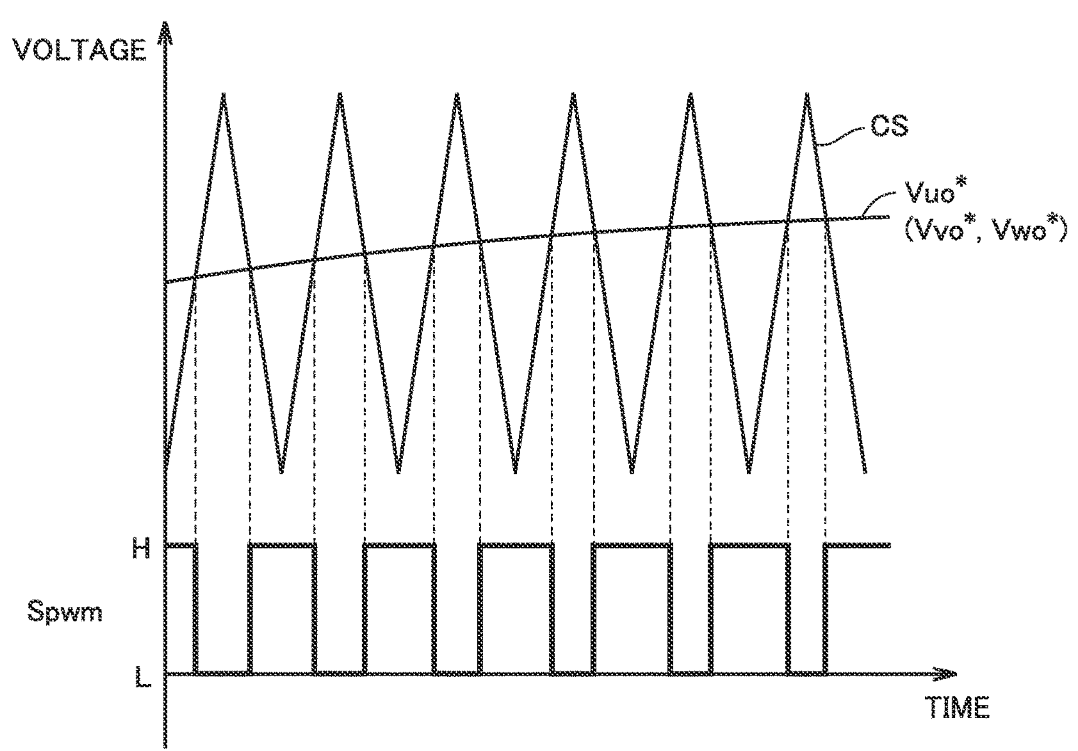
FIG. 5 is a conceptual waveform diagram for explaining PWM control in a gate signal generating unit in FIG. 1.

FIG. 5 shows a conceptual waveform diagram for explaining PWM control in gate signal generating unit 110. The signal waveforms shown in FIG. 5 are exaggerated for the sake of explanation and do not depict actual signal waveforms as they are.

As shown in FIG. 5, for each converter cell 10, a PWM modulation signal Spwm can be generated by voltage comparison between output voltage command value Vuo*, Vvo*, Vwo* of converter cell 10 and a carrier signal CS from a not-shown carrier generator. Carrier signal CS is formed of a periodical signal such as a triangular wave.

For example, when a voltage of output voltage command value Vuo*, Vvo*, Vwo* is higher than a voltage of carrier signal CS, PWM modulation signal Spwm is set to high level (H level). Conversely, when a voltage of carrier signal CS is higher than output voltage command value Vuo*, Vvo*, Vwo*, PWM modulation signal Spwm is set to low level (L level).

Carrier signal CS is generated such that timings of PWM signal is shifted from each other between N converter cells 10 of individual phases to implement phase shift PWM control. For example, carrier signals CS having phases shifted from each other can be generated in PWM control in N converter cells 10 of individual phases, based on a predetermined common reference phase θi.

Gate signal generating unit 110 generates, for each converter cell 10, a gate signal for controlling on/off for each of switching elements 13 included in the converter cell 10, based on PWM modulation signal Spwm shown in FIG. 5. Each switching element 13 of each converter cell 10 is driven on/off in accordance with a gate signal from gate signal generating unit 110, whereby power conversion controlled as described above by converter control unit 7 is performed by power conversion unit 6.

In this way, in power conversion device 1*a* according to the first embodiment, for each of arms 4 disposed for individual phases, an AC oscillation component of capacitor voltage Vc in which variation of stored energy of DC capacitor 15 (power storage element) appears is extracted, and an output voltage command value of converter cell 10 in each arm 4 can be corrected to compensate for capacitor voltage variation due to the oscillation component. This increases the effect of suppressing variation of capacitor voltage Vc, that is, stored energy of DC capacitor 15 (power storage element) in a specific frequency component (for example, an integer multiple of the grid frequency) produced in arm 4 of each phase, thereby suppressing harmonic current output from power conversion device 1*a*.

Second Embodiment

In a second embodiment, a modification of the configuration of modulation index correcting unit 90 will be described. In a power conversion device according to the second embodiment, the configuration and operation is similar to that of the first embodiment except for modulation index correcting unit 90 and therefore a description will basically not be repeated.

In the first embodiment, an AC oscillation component of a specific frequency (typically, 2*f*) of an integer multiple of the grid frequency is extracted from the average value of capacitor voltages Vc in arm 4 of each phase, whereas in the second embodiment, the AC oscillation component is extracted based on power input/output to/from N converter cells 10 in arm 4 of each phase.

In each arm 4 shown in FIG. 1, charge/discharge power of DC capacitor 15 is included in input/output power for N converter cells 10 (hereinafter referred to as "arm power") indicated by the product of a voltage applied to N converter cells 10 (hereinafter referred to as "arm voltage") and a current flowing through the arm 4 (hereinafter referred to as "arm current"). As described above, since capacitor voltage Vc oscillates due to the frequency component of an integer multiple (typically 1*f* or 2*f*) of the grid frequency as a result of oscillation of stored energy of DC capacitor 15, the oscillation component can be extracted from arm power. For example, when load current is 0, if a DC component is fed to circulating current, the same power pulsation as the grid frequency is produced in the arm power of each phase of power conversion device 1*a*.

Figure 6:
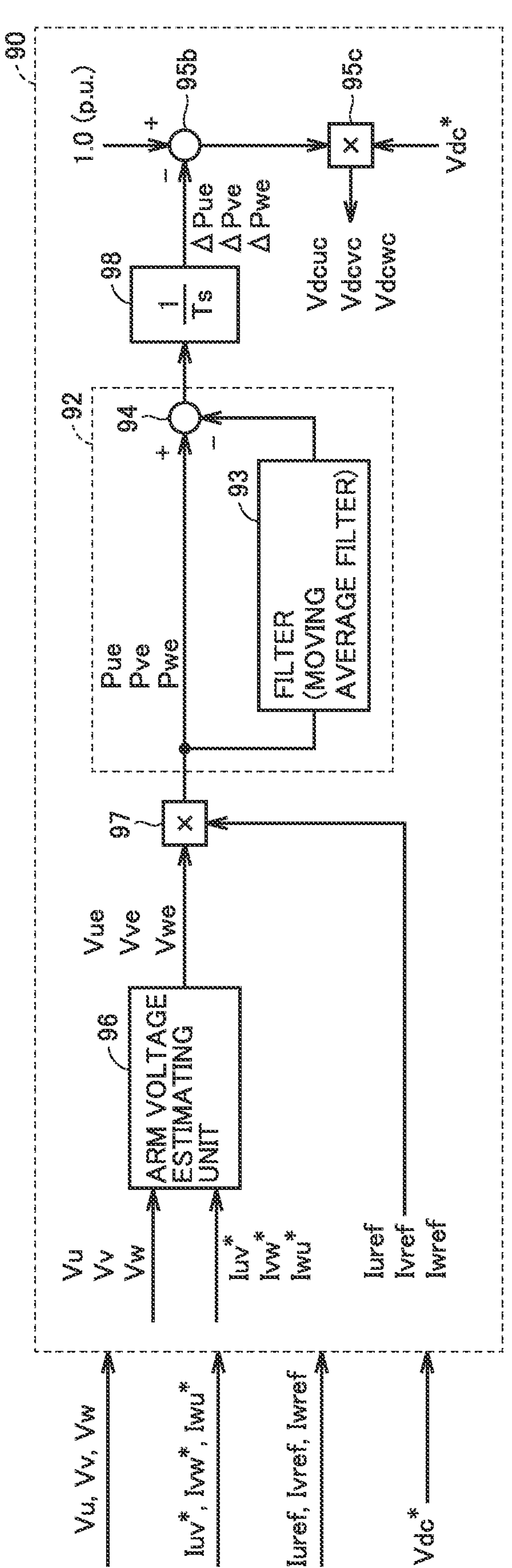
FIG. 6 is a block diagram illustrating an internal configuration example of a modulation index correcting unit in a power conversion device according to a second embodiment.

FIG. 6 shows a block diagram illustrating an internal configuration example of modulation index correcting unit 90 in a power conversion device according to the second embodiment.

In the second embodiment, as indicated by a dotted line in FIG. 1, modulation index correcting unit 90 receives grid AC voltages Vu, Vv, Vw detected by AC voltage detecting unit 20, arm current command values Iuv*, Ivw*, Iwu* output from voltage balance control unit 60, and output current command values Iuref, Ivref, Iwref output from output current control unit 70. Modulation index correcting unit 90 further receives voltage command value Vdc* for voltage balance control, in the same manner as in the first embodiment.

As shown in FIG. 6, in the second embodiment, modulation index correcting unit 90 includes an arm voltage estimating unit 96, a power estimating unit 97, a frequency filter 92, an integrator 98, a subtractor 95*b*, and a multiplier 95*c*.

Arm voltage estimating unit 96 calculates AC grid line voltage effective values Vuv, Vvw, Vwu from grid AC voltages Vu, Vv, Vw according to equations (8) to (10).

$$Vuv=\sqrt{3}\cdot Vu/\sqrt{2} \tag{8}$$

$$Vvw=\sqrt{3}\cdot Vv/\sqrt{2} \tag{9}$$

$$Vwu=\sqrt{3}\cdot Vw/\sqrt{2} \tag{10}$$

Further, arm voltage estimating unit 96 calculates arm voltage estimate values Vue, Vve, Vwe, which are estimate values of voltage applied to N converter cells 10 included in arms 4 of individual phases, using arm current command values Iuv*, Ivw*, Iwu*, inductance Larm of arm reactor 5, and grid frequency f, according to equations (11) to (13).

$$Vue=Vuv+Iuv^{*}\cdot(2\pi\cdot f)\cdot Larm \tag{11}$$

$$Vve=Vvw+Ivw^{*}\cdot(2\pi\cdot f)\cdot Larm \tag{12}$$

$$Vwe=Vwu+Iwu^{*}\cdot(2\pi\cdot f)\cdot Larm \tag{13}$$

Power estimating unit 97 calculates arm power estimate values Pue, Pve, Pwe of individual phases, using arm voltage estimate values Vue, Vve, Vwe of arms 4 of individual phases, and output current command values Iuref, Ivref, Iwref, according to equations (14) to (16).

$$Pue=(Vue\cdot Iuref)/Pr \tag{14}$$

$$Pve=(Vve\cdot Ivref)/Pr \tag{15}$$

$$Pwe=(Vwe\cdot Iwref)/Pr \tag{16}$$

Pr in equations (14) to (16) is a reference power (for example, rated power), and the unit of arm power estimate values Pue, Pve, Pwe is [p.u].

Frequency filter 92 is configured in the same manner as in the first embodiment. Frequency filter 92 extracts AC oscillation components included in arm power estimate values Pue, Pve, Pwe, preferably AC oscillation components each including a frequency component of an integer multiple of the grid frequency. The AC oscillation components extracted from temporal change of arm power are input to integrator 98.

Integrator 98 outputs the time integrals of the AC oscillation components of arm power estimate values Pue, Pve, Pwe output from frequency filter 92, as arm power variation amounts ΔPue, ΔPve, ΔPwe. The integral time constant in integrator 98 is set to be shorter than the reciprocal of the grid frequency (1/50 [s] or 1/60 [s]) in order to remove noise.

As shown in FIG. 1, since the output direction of arm currents Iuv, Ivw, Iwu from power conversion device 1*a* to AC power grid 2 is the positive direction, an arm power of a positive value acts as discharge power of DC capacitor 15 whereas an arm power of a negative value acts as charge power of DC capacitor 15.

Therefore, subtractor 95*b* can convert the AC variation components of arm power estimate values Pue, Pve, Pwe into AC variation components of capacitor voltage Vc in the first embodiment by subtracting the output value of integrator 98 from 1.0 [p.u] indicating rating. Further, multiplier 95*c* calculates modulation index correction signals Vdcuc, Vdcvc, Vdcwc of individual arms 4 by multiplying the outputs of arms 4 of individual phases from subtractor 95*b* by voltage command value Vdc*. In other words, modulation index correction signals Vdcuc, Vdcvc, Vdcwc are calculated by the following equations (17) to (19).

$$Vdcuc=(1.0-\Delta Pue)\cdot Vdc^{*} \tag{17}$$

$$Vdcvc=(1.0-\Delta Pve)\cdot Vdc^{*} \tag{18}$$

$$Vdcwc=(1.0-\Delta Pwe)\cdot Vdc^{*} \tag{19}$$

According to equations (17) to (19), variation in the increasing direction of the arm power estimate value in the direction of discharging DC capacitor 15 acts such that modulation index correction signals Vdcuc, Vdcvc, Vdcwc are set to be lower than voltage command value Vdc*. Conversely, it is understood that variation in the decreasing direction of the arm power estimate value acts such that modulation index correction signals Vdcuc, Vdcvc, Vdcwc are set to be higher than voltage command value Vdc*.

The calculated modulation index correction signals Vdcuc, Vdcvc, Vdcwc are input to voltage command value computing unit 100 similar to that in the first embodiment and used for calculation of output voltage command values Vuo, Vvo, Vwo of converter cells 10 in arms 4 of individual phases according to the above equations (5) to (7).

As a result, in the second embodiment, output voltage command values Vuo, Vvo, Vwo can be calculated with compensation for an oscillation component of stored energy of DC capacitor 15, in the same manner as in the first embodiment, by performing division by modulation index correction signals Vdcuc, Vdcvc, Vdcwc having an AC oscillation component (including a frequency of an integer multiple of the grid frequency) of power (arm power) input/output to N converter cells 10 of arm 4.

The calculated output voltage command values Vuo, Vvo, Vwo are input to gate signal generating unit 110. Gate signal generating unit 110 generates a gate signal for controlling on/off drive of switching element 13 of each converter cell 10 in each arm 4 by performing PWM control based on output voltage command values Vuo*, Vvo*, Vwo* computed from output voltage command values Vuo, Vvo, Vwo from voltage command value computing unit 100, in the same manner as in the first embodiment.

Therefore, in the power conversion device according to the second embodiment, modulation index correcting unit 90 in power conversion device 1*a* in FIG. 1 has the internal configuration of FIG. 6 whereby an AC oscillation component of input/output power for arm 4 of each phase can be extracted, and an output voltage command value of each arm 4 can be corrected to compensate for the oscillation component. With this configuration, an output voltage command value of each arm 4 can be generated to compensate for an AC signal component of stored energy of DC capacitor 15 (power storage element) in a specific frequency (an integer multiple of the grid frequency) produced in arm 4 of each phase, in the same manner as in the first embodiment.

Therefore, also in the power conversion device according to the second embodiment, harmonic current output from power conversion device 1*a* can be suppressed by increasing the effect of suppressing oscillation in a specific frequency (an integer multiple of the grid frequency) of stored energy of DC capacitor 15 produced in arm 4 of each phase, in the same manner in the first embodiment.

Third Embodiment

In the power conversion device according to the second embodiment, an AC oscillation component of input/output power in arm 4 of each phase is computed using an arm voltage estimate value and an output current command value. However, when load current (output current) of the power conversion device is small, decrease of arm current may deteriorate the control function of changing capacitor voltage Vc, that is, stored energy of DC capacitor 15. This may deteriorate the effect of suppressing output harmonic current. In a third embodiment, a control configuration for suppressing harmonic current even when load current is small will be described.

In the third embodiment, the configuration of circulating current control unit 80 and modulation index correcting unit 90 is changed from that of the first and second embodiments. In a power conversion device according to the third embodiment, the configuration and operation is similar to that of the first embodiment except for circulating current control unit 80 and modulation index correcting unit 90 and therefore a description will basically not be repeated.

Figure 7:
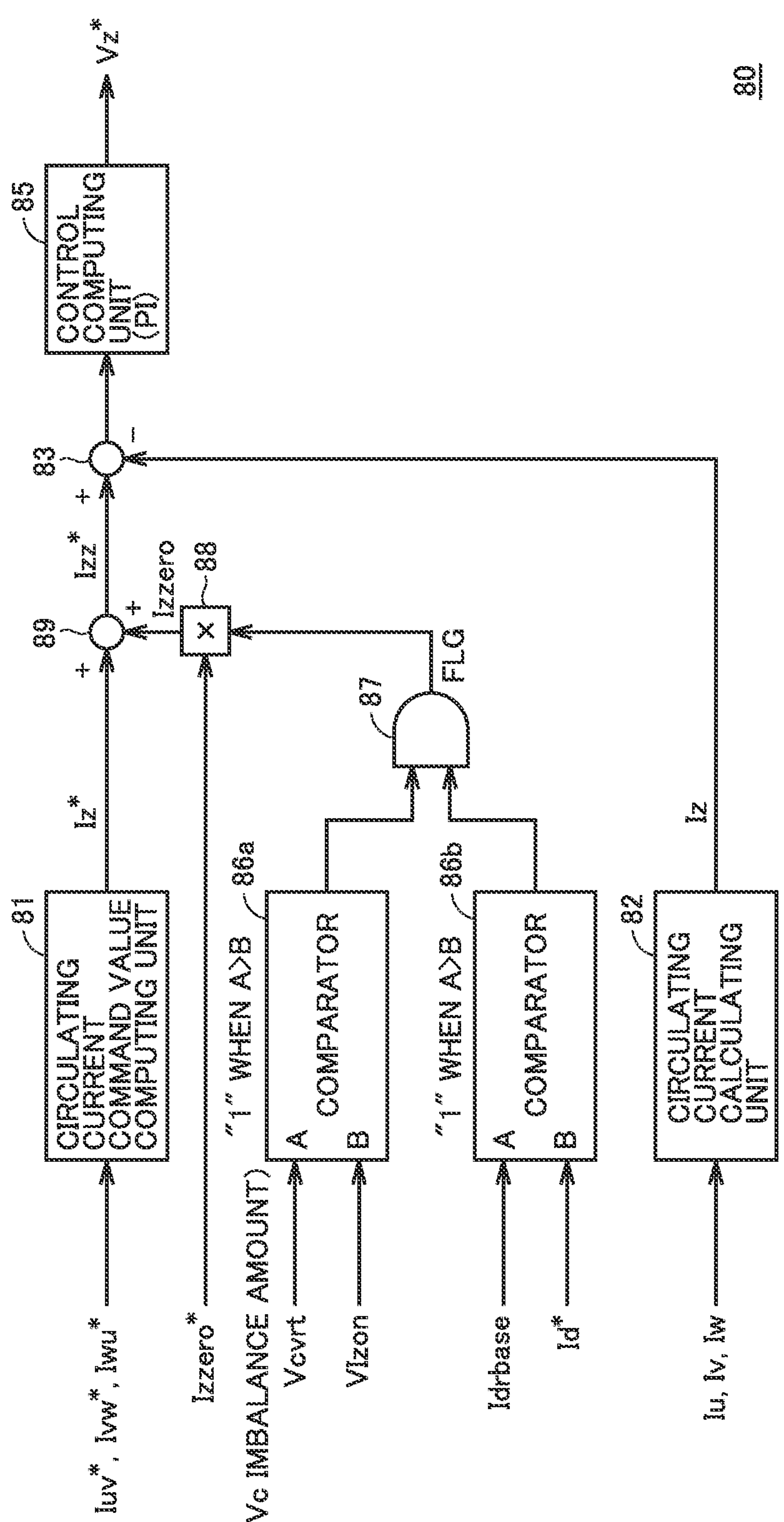
FIG. 7 is a block diagram illustrating an internal configuration example of a circulating current control unit in a power conversion device according to a third embodiment.

FIG. 7 shows a block diagram illustrating an internal configuration example of circulating current control unit 80 in a power conversion device according to the third embodiment.

As shown in FIG. 7, circulating current control unit 80 includes a circulating current command value computing unit 81, a circulating current calculating unit 82, a deviation computing unit 83, and a control computing unit 85, as well as comparators 86*a*, 86*b*, an AND gate 87, a multiplier 88, and an adder 89 for calculating a correction amount Izzero of a circulating current command value.

Circulating current command value computing unit 81 calculates a circulating current command value Iz* from arm current command values Iuv*, Ivw*, Iwu* of individual phases output from voltage balance control unit 60, in accordance with equation (2) explained in the first embodiment.

Circulating current calculating unit 82 calculates a circulating current Iz from arm currents Iuv, Ivw, Iwu of individual phases detected by arm current detecting units 40, in accordance with equation (3) explained in the first embodiment.

Adder 89 calculates a corrected circulating current command value Izz* by adding circulating current command value Iz* from circulating current command value computing unit 81 and correction amount Izzero output from multiplier 88.

Deviation computing unit 83 calculates a current deviation ΔIz by subtracting circulating current Iz output by circulating current calculating unit 82 from circulating current command value Izz* output by adder 89. Control computing unit 85 calculates a zero phase voltage command value Vz* for bringing current deviation ΔIz closer to zero, that is, for controlling such that circulating current Iz follows circulating current command value Izz*, in accordance with predetermined control computation such as PI (proportional integral) control.

Therefore, in circulating current control unit 80 shown in FIG. 7, when correction amount Izzero=0, Izz*=Iz*, and then the operation of circulating current control unit 80 in this case is similar to that described in the first embodiment.

The operation of comparators 86*a*, 86*b*, AND gate 87, multiplier 88, and adder 89 added in the third embodiment will now be described.

Comparator 86*a* receives an evaluation value Vcvrt of the imbalance amount of capacitor voltages Vc of converter cells 10 and a predetermined preset value VIzon. For example, evaluation value Vcvrt can be set to Vcvrt=(Vcmax−Vcave) and Vcvrt=(Vcave−Vcmin), using average value Vcave, maximum value Vcmax, and minimum value Vcmin of capacitor voltages Vc of all converter cells 10 that are calculated by voltage command value computing unit 61 (voltage balance control unit 60) in FIG. 3. Evaluation value Vcvrt corresponds to an example of "second preset value".

Comparator 86*a* outputs "1" when at least one of two conditions: (Vcmax−Vcave)>VIzon and (Vcave−Vcmin)>VIzon is satisfied. On the other hand, comparator 86*a* outputs "0" when neither of the above two conditions is satisfied. In other words, comparator 86*a* is configured to detect that the imbalance in capacitor voltage Vc in converter cells 10 is large.

Comparator 86*b* receives reactive current command value Id* and a predetermined preset value Idrbase. Comparator 86*b* outputs "1" when Id*<Idrbase and outputs "0" when Id*≥Idrbase. In other words, comparator 86*b* is configured to detect that the load current (output current to AC power grid 2) of power conversion device 1*a* is small when reactive current command value Id* is smaller than a preset value. Preset value Idrbase corresponds to an example of "first preset value.

AND gate 87 outputs the logical product (AND) operation result of an output value of comparator 86*a* and an output value of comparator 86*b*. Multiplier 88 outputs a multiplication value of output value FLG (1 or 0) of AND gate 87 and a preset increase amount Izzero* of the circulating current command value, as correction amount Izzero, to adder 89.

Correction amount Izzero is therefore set to Izzero=Izzero* when the load current of power conversion device 1*a* is small and the imbalance in capacitor voltage Vc is large, and otherwise set to Izzero=0.

As a result, in a state in which the load current is small and the imbalance in capacitor voltage Vc is large, zero phase current command value Izz* can be set by increasing normal circulating current command value Iz* by Izzero*. On the other hand, when Izzero=0, circulating current Iz is controlled with zero phase current command value Izz*−Iz*, in the same manner as in the first embodiment.

With this configuration, in the power conversion device according to the third embodiment, if the imbalance in capacitor voltage Vc increases in a state in which load current is small, circulating current is increased to ensure the change amount of capacitor voltage Vc.

In the third embodiment, as indicated by a dotted line in FIG. 1, the corrected circulating current command value Izz* is further output from circulating current control unit 80, in addition to zero phase voltage command value Vz*.

Figure 8:
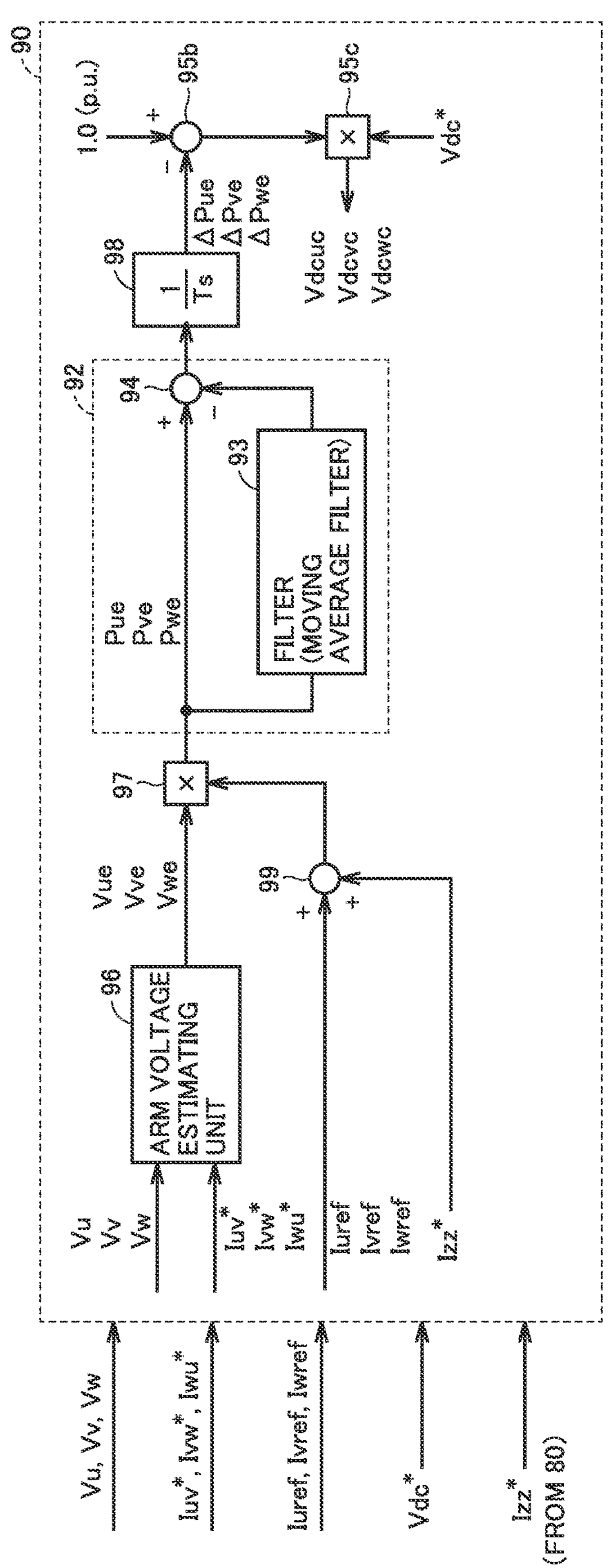
FIG. 8 is a block diagram illustrating an internal configuration example of a modulation index correcting unit in the power conversion device according to the third embodiment.

FIG. 8 shows a block diagram illustrating an internal configuration example of modulation index correcting unit 90 in the power conversion device according to the third embodiment.

As shown in FIG. 8, modulation index correcting unit 90 according to the third embodiment further includes an adder 99 in addition to the configuration according to the second embodiment shown in FIG. 6.

Adder 99 adds circulating current command value Izz* from circulating current control unit 80 to output current command values Iuref, Ivref, Iwref of arms 4 of individual phases. Then, power estimating unit 97 calculates arm power estimate values Pue, Pve, Pwe of individual phases, according to the following equations (20) to (22), using arm voltage estimate values Vue, Vve, Vwe from arm voltage estimating unit 96 similar to that of the second embodiment, and an output value of adder 99.

$$Pue=(Vue\cdot(Iuref+Izz^{*}))/Pr \tag{20}$$

$$Pve=(Vve\cdot(Ivref+Izz^{*}))/Pr \tag{21}$$

$$Pwe=(Vwe\cdot(Iwref+Izz^{*}))/Pr \tag{22}$$

Equations (20) to (22) are obtained by replacing output current command values Iuref, Ivref, Iwref by (Iuref+Izz*), (Ivref+Izz*), (Iwref+Izz*) in equations (14) to (16).

With this configuration, when load current is small, unlike when load current is large, arm power estimate values Pue, Pve, Pwe can be calculated such that the increase amount (0 or Izzero*) of the circulating current command value by circulating current control unit 80 is reflected, in order to cope with an unignorable ratio of circulating current to arm current. The subsequent operation of frequency filter 92, integrator 98, subtractor 95*b*, and multiplier 95*c* is similar to that in the second embodiment (FIG. 6).

Therefore, in a normal state (Izzero=0), modulation index correction signals Vdcuc, Vdcvc, Vdcwc of individual arms 4 are calculated in the same manner as in the second embodiment. Further, when the circulating current command value is increased in circulating current control unit 80, the modulation index correction signal can be generated by power estimation computation that reflects the increase amount. Since the second embodiment is premised on that the load current is large, it is less necessary to reflect the circulating current command value in calculation of arm power estimate values Pue, Pve, Pwe.

As a result, in the power conversion device according to the third embodiment, when load current is small, if the imbalance in stored energy of DC capacitor 15, that is, capacitor voltage Vc increases, circulating current is increased and thereby arm current is increased without outputting current to the grid side, thereby ensuring the control ability of changing capacitor voltage Vc.

Further, since the arm power estimate value can be determined accurately such that the increase of arm current by circulating current control is reflected, harmonic current output from power conversion device 1*a* can be suppressed by increasing the effect of suppressing an oscillation component of a specific frequency (an integer multiple of the grid frequency) of stored energy of DC capacitor 15 produced in arm 4 of each phase, in the same manner as in the second embodiment.

The third embodiment may be modified such that only circulating current control unit 80 is replaced by the configuration of the third embodiment (FIG. 7) in the configuration of the first embodiment, and modulation index correcting unit 90 remains the same as the configuration of the first embodiment (FIG. 4). In this modification, in addition to the effect in the foregoing first embodiment, the effect of suppressing output harmonic current can be achieved by ensuring the control ability of suppressing an AC oscillation component of capacitor voltage Vc even when load current is small.

In the second and third embodiments, an estimate value obtained by computation with a voltage estimate value and a current command value is used for the arm power for each arm 4. However, the arm power may be determined by other methods. For example, a measurement value (detection value) may be directly used for at least one of voltage and current, and a voltage command value may be used.

In the first to third embodiments, different methods of calculating modulation index correction signals Vdcuc, Vdcvc, Vdcwc in power conversion device 1*a* (power conversion unit 6) in delta connection shown in FIG. 1 have been described. The calculations of modulation index correction signals Vdcuc, Vdcvc, Vdcwc according to the first to third embodiments can be selectively used for control of power conversion unit 6. Alternatively, the calculations of modulation index correction signals Vdcuc, Vdcvc, Vdcwc according to the first to third embodiments may be applied in a switching manner depending on the operating conditions of power conversion device 1*a*.

Fourth Embodiment

In the first to third embodiments, the control of power conversion device 1*a* having three phase arms connected in parallel with three phases of the AC power grid has been described. In the fourth and subsequent embodiments, the control of a power conversion device 1*b* connected between an AC power grid and a DC line to constitute a power system will be described.

Figure 9:
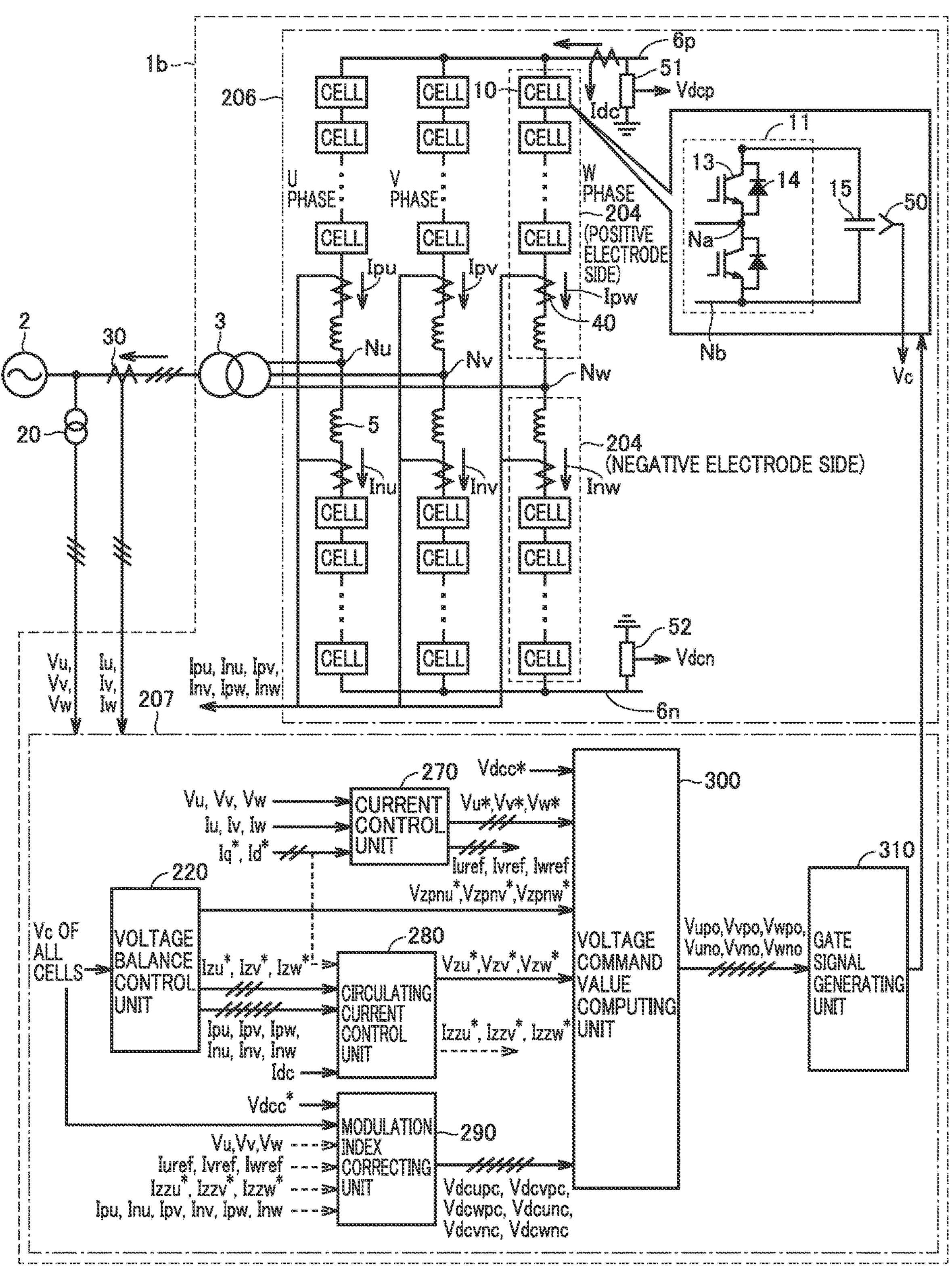
FIG. 9 is a block diagram illustrating a configuration of a power conversion device according to a fourth embodiment.

FIG. 9 shows a block diagram illustrating a configuration of power conversion device 1*b* according to the fourth embodiment.

As shown in FIG. 9, power conversion device 1*b* is connected between three phase AC power grid 2 and DC lines 6*p*, 6*n*. Power conversion device 1*b* includes a power conversion unit 206 and a converter control unit 207.

Power conversion unit 206 has arms 204 between AC end Nu, Nv, Nw connected to interconnection transformer 3 and DC line 6*p* on the positive electrode side and between the AC end Nu, Nv, Nw and DC line 6*n* on the negative electrode side in each of U phase, V phase, and W phase. Each arm 204 is configured such that N (N is a natural number equal to or greater than 2) converter cells 10 and an arm reactor 5 are connected in series, in the same manner as arm 4 in the first embodiment. The configuration of each converter cell 10 can be similar to that of power conversion device 1*a* in the first embodiment. In FIG. 9, converter cell 10 of half bridge configuration is illustrated.

In the following, for each phase, the arm connected between the AC end and DC line 6*p* may be referred to as “positive electrode-side arm”, and the arm connected between the AC end and DC line 6*n* may be referred to as “negative electrode-side arm”.

Power conversion unit 206 further includes an arm current detecting unit 40 disposed corresponding to each arm 204, a DC capacitor voltage detecting unit 50 disposed for each converter cell 10, a DC voltage detecting unit 51 disposed for DC line 6*p*, and a DC voltage detecting unit 52 disposed for DC line 6*n*.

Arm current detecting units 40 detect arm currents Ipu, Inu respectively passing through the positive electrode-side and negative electrode-side arms 204 of U phase, arm currents Ipv, Inv respectively passing through the positive electrode-side and negative electrode-side arms 204 of V phase, and arm currents Ipw, Inw respectively passing through the positive electrode-side and negative electrode-side arms 204 of W phase. DC capacitor voltage detecting unit 50 detects a voltage of DC capacitor 15 (capacitor voltage Vc), for each converter cell 10.

DC voltage detecting unit 51 detects a DC voltage Vdcp of DC line 6*p*. DC voltage detecting unit 52 detects a DC voltage Vden of DC line 6*n*. In the following, the voltage difference between DC voltage Vdcp and DC voltage Vden, multiplied by (½), is defined as DC voltage Vdcc. As one of operating states of power conversion device 1*b*, a voltage command value Vdcc* for DC voltage Vdcc, that is, a DC voltage applied to each arm 204 is predetermined.

AC voltage detecting unit 20 and output current detecting unit 30 similar to those in the first embodiment are disposed for AC power grid 2. Detection values of three phase grid AC voltages Vu, Vv, Vw by AC voltage detecting unit 20 and detection values of three phase AC output currents Iu, Iv, Iw of AC power grid 2 by output current detecting unit 30 are input to power conversion device 1*b*.

Converter control unit 207 controls power conversion unit 206 in accordance with an operation command value by controlling on/off of each switching element 13 of each converter cell 10. Converter control unit 207 is shown in a functional block diagram as a group of control functions, in the same manner as converter control unit 7 in FIG. 1. The hardware configuration of converter control unit 207 can be similar to that of converter control unit 7 described in the first embodiment.

Converter control unit 207 includes a current control unit 270, a voltage balance control unit 220 and a circulating current control unit 280 for balancing capacitor voltages Vc of converter cells 10, a modulation index correcting unit 290, a voltage command value computing unit 300, and a gate signal generating unit 310.

Current control unit 270 performs power control of power conversion unit 206 by controlling active current Iq and reactive current Id. Current control unit 270 receives grid AC voltages Vu, Vv, Vw and AC output currents Iu, Iv, Iw detected by AC voltage detecting unit 20 and output current detecting unit 30, and active current command value Iq* and reactive current command value Id*. Active current command value Iq* and reactive current command value Id* are predetermined based on the operating conditions of power conversion device 1*b*, in the same manner as in the first embodiment.

In current control unit 270, voltage command values Vd*, Vq* on the dq axis are computed by performing feedback control such that active current Iq and reactive current Id obtained by three phase/two phase conversion of AC output currents Iu, Iv, Iw follow active current command value Iq* and reactive current command value Id*, in the same manner as output current control unit 70 in the first embodiment. Three phase voltage command values Vu*, Vv*, Vw* are calculated by two phase/three phase conversion of voltage command values Vd*, Vq, in the same manner as in the first embodiment.

Further, in current control unit 270, three phase output current command values Iuref, Ivref, Iwref are calculated by two phase/three phase conversion of current command values Id*, Iq* on the dq axis, in the same manner as output current control unit 70 in the first embodiment. Current control unit 270 outputs voltage command values Vu*, Vv*, Vw* and output current command values Iuref, Ivref, Iwref of U phase, V phase, and W phase. It is understood that voltage command values Vu*, Vv*, Vw* and output current command values Iuref, Ivref, Iwref are sinusoidal in the same manner as in the first embodiment.

Voltage balance control unit 220 receives capacitor voltages Vc of all converter cells 10 of power conversion unit 206 detected by DC capacitor voltage detecting units 50. Voltage balance control unit 220 calculates circulating current command values Izu*, Izv*, Izw* of individual phases for balancing capacitor voltages Vc of converter cells 10 between the positive electrode-side arm and the negative electrode-side arm of U phase, V phase, and W phase.

Figures 10, 11:
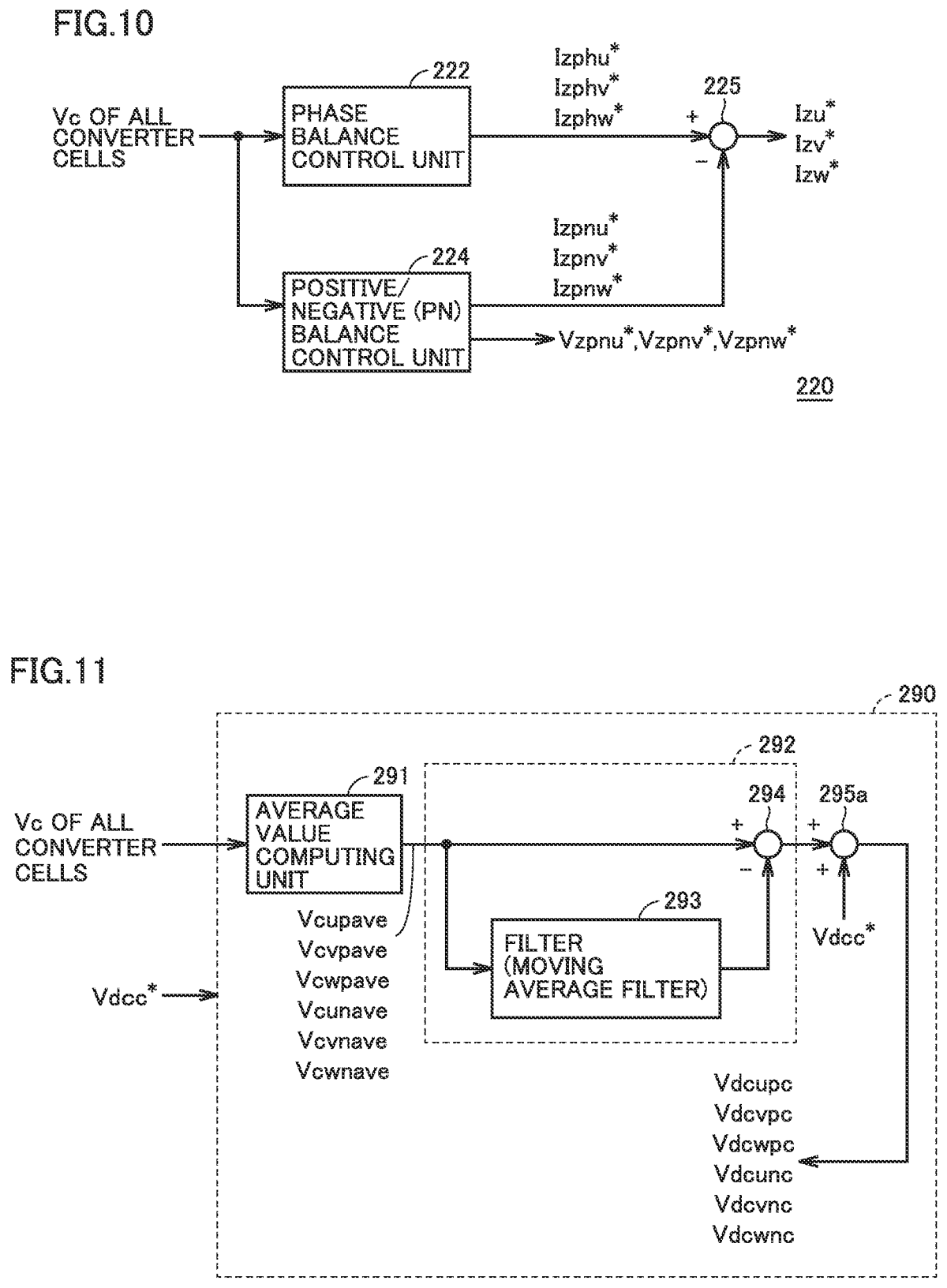

FIG. 10 shows an internal configuration example of voltage balance control unit 220 in FIG. 9.

As shown in FIG. 10, voltage balance control unit 220 includes a phase balance control unit 222, a positive/negative balance control unit 224, and a subtractor 225.

Phase balance control unit 222 calculates circulating current command values Izphu*, Izphv*, Izphw* for phase balance for suppressing the imbalance in capacitor voltage Vc between U phase, V phase, and W phase, in the same manner as voltage balance control unit 60 in the first embodiment. For example, representative voltage value Vcall of capacitor voltages Vc of all converter cells 10 ((6×N) cells) in six arms 204 of power conversion unit 206 are calculated, and circulating current command values Izphu*, Izphv*, Izphw* for phase balance can be calculated such that representative voltage values Vdcu, Vdcv, Vdcw of the capacitor voltages Vc of DC capacitors 15 of a total of (2·N) converter cells 10 included in the positive electrode-side and negative electrode-side arms 204 in each phase follow representative voltage value Vcall.

The average value, the median value, the maximum value, or the minimum value of capacitor voltages Vc of all converter cells or capacitor voltages Vc of (2·N) converter cells 10 in the same phase can also be used for representative voltage values Vcall, Vdcu, Vdcv, Vdcw, in the same manner as in the first embodiment.

Positive/negative balance control unit 224 controls the balance in DC capacitor voltage between the positive electrode-side arm and the negative electrode-side arm of each phase. For example, in positive/negative balance control unit 224, detection values of capacitor voltages Vc of DC capacitors 15 of all converter cells 10 are input, a value equivalent to the average value of capacitor voltages Vc of N converter cells 10 for each of the positive electrode-side arm and the negative electrode-side arm for each phase is computed, and circulating current command values Izpnu*, Izpnv*, Izpnw* for positive and negative balance and voltage command values Vzpnu*, Vzpnv*, Vzpnw* for positive and negative balance are output for controlling such that the difference of the value equivalent to the average value is zero between the positive electrode-side arm and the negative electrode-side arm. The above value equivalent to the average value may be a representative value computed from the average value, the median value, or the maximum value and the minimum value of capacitor voltages Vc in each arm 204.

For representative voltage values Vcpu, Vcpv, Vcpw, Vcnu, Vcnv, Vcnw, the average value, the median value, the maximum value, or the minimum value of capacitor voltages Vc of N converter cells 10 in each arm 204 may be used.

Subtractor 225 calculates circulating current command values Izu*, Izv*, Izw* of individual phases by subtracting circulating current command values Izpnu, Izpnv, Izpnw for positive and negative balance calculated by positive/negative balance control unit 224 from circulating current command values Izphu*, Izphv*, Izphw* for phase balance calculated by phase balance control unit 222. In other words, Izu*=Izphu*−Izpnu*, Izv*=Izphv*−Izpnv*, and Izw*=Izphw*−Izpnw*. Voltage balance control unit 220 outputs the calculated circulating current command values Izu*, Izv*, Izw* and voltage command values Vzpnu*, Vzpnv*, Vzpnw* for positive and negative balance.

Also in power conversion device 1*b* according to the fourth embodiment, capacitor voltage Vc includes a DC component and an AC variation component. The AC variation component includes a frequency component of an integer multiple of the grid frequency (for example, 50 [Hz] or 60 [Hz]) of AC power grid 2. Since DC-AC power conversion is performed in power conversion device 1*b*, oscillation of the same frequency component (1*f*) as the grid frequency is likely to occur in capacitor voltage Vc.

As shown in FIG. 9, circulating current control unit 280 receives circulating current command values Izu*, Izv*, Izw* of individual phases output from voltage balance control unit 220, and arm currents Ipu, Ipv, Ipw, Inu, Inv, Inw on the positive electrode side and the negative electrode side of individual phases detected by arm current detecting unit 40.

Circulating current control unit 280 calculates circulating currents Izu, Izv, Izw according to the following equations (23) to (25), using arm currents Ipu, Ipv, Ipw, Inu, Inv, Inw and DC current Idc shown in FIG. 9.

$$Izu = (Ipu + Inu)/2 - Idc/3 \tag{23}$$

$$Izv = (Ipv + Inv)/2 - Idc/3 \tag{24}$$

$$Izw = (Ipw + Inw)/2 - Idc/3 \tag{25}$$

Circulating current control unit 280 outputs circulating voltage command values Vzu*, Vzv*, Vzw* of individual phases for controlling such that the calculated circulating currents Izu, Izv, Izw respectively follow circulating current command values Izu*, Izv*, Izw* from voltage balance control unit 220.

Modulation index correcting unit 290 receives capacitor voltages Vc of all converter cells 10 of power conversion unit 206 and voltage command value Vdcc* between DC lines 6*p* and 6*n*. FIG. 11 shows an internal configuration example of modulation index correcting unit 290 in FIG. 9.

As shown in FIG. 11, modulation index correcting unit 290 includes an average value computing unit 291, a frequency filter 292, and an adder 295*a*.

Average value computing unit 291 computes an average value of capacitor voltages Vc of DC capacitors 15 of N converter cells 10 for each arm 204, in the same manner as average value computing unit 91 in the first embodiment. Therefore, average value computing unit 291 calculates capacitor voltage average values Vcupave, Vcvpave, Vcwpave, Vcunave, Vcvnave, Vcwnave for the respective positive electrode-side arms and negative electrode-side arms of U phase, V phase, and W phase. For example, capacitor voltage average value Vcupave is calculated using capacitor voltages Vc of N DC capacitors 15 of N converter cells 10 included in the positive electrode-side arm 204 of U phase. Further, capacitor voltage average value Vcunave is calculated using capacitor voltages Vc of N DC capacitors 15 of N converter cells 10 included in the negative electrode-side arm 204 of U phase. Capacitor voltage average values Vcvpave, Vcvnave, Vcwpave, Vcwnave are also calculated from capacitor voltages Vc of N converter cells 10 of the positive electrode-side and negative electrode-side arms 204 similarly in V phase and W phase.

Frequency filter 292 includes a moving average filter 293 and a subtractor 294. Frequency filter 292 is configured in the same manner as frequency filter 92 in the first embodiment and extracts an AC oscillation component of a frequency (If, 2*f*, etc.) of an integer multiple of the grid frequency from temporal change in average value of capacitor voltages Vc of each arm 204. Adder 295*a* calculates modulation index correction signals Vdcupc, Vdcvpc, Vdcvpw of respective arms 204 on the positive electrode side of U phase, V phase, and W phase and modulation index correction signals Vdcunc, Vdcvnc, Vdcwnc of respective arms 204 on the negative electrode side by adding AC oscillation components of capacitor voltage average values Vcupave, Vcvpave, Vcwpave, Vcunave, Vcvnave, Vcwnave extracted by frequency filter 292 and voltage command value Vdcc*.

As shown in FIG. 9, voltage command value computing unit 300 receives sinusoidal voltage command values Vu*, Vv*, Vw* of individual phases output from current control unit 270, circulating voltage command values Vzu*, Vzv*, Vzw* output from circulating current control unit 280, modulation index correction signals Vdcupc, Vdcvpc, Vdcwpc, Vdcunc, Vdcvnc, Vdcwnc of individual arms 204 output from modulation index correcting unit 290, voltage command values Vzpnu*, Vzpnv*, Vzpnw* for positive and negative balance from voltage balance control unit 220, and a predetermined voltage command value Vdcc*.

Using these input values, voltage command value computing unit 300 calculates output voltage command values Vupo, Vvpo, Vwpo, Vuno, Vvno, Vwno of converter cells 10 in the positive electrode-side and negative electrode-side arms 204 of individual phases, by computation of the following equations (26) to (31). In other words, voltage command values Vu*, Vv*, Vw* of individual phases correspond to an example of "first voltage command value", circulating voltage command values Vzu*, Vzv*, Vzw* correspond to an example of "second voltage command value", voltage command values Vzpnu*, Vzpnv*, Vzpnw* for positive and negative balance correspond to an example of "third voltage command value", and a predetermined voltage command value Vdcc* corresponds to an example of "fourth voltage command value".

$$Vupo = (Vdcc* + Vzu* - Vu* - Vzpnu*)/Vdcupc \tag{26}$$

$$Vvpo = (Vdcc* + Vzv* - Vv* - Vzpnv*)/Vdcvpc \tag{27}$$

$$Vwpo = (Vdcc* + Vzw* - Vw* - Vzpnw*)/Vdcwpc \tag{28}$$

$$Vuno = (Vdcc* + Vzu* + Vu* + Vzpnu*)/Vdcunc \tag{29}$$

$$Vvno = (Vdcc* + Vzv* + Vv* + Vzpnv*)/Vdcvnv \tag{30}$$

$$Vwno = (Vdcc* + Vzw* + Vw* + Vzpnw*)/Vdcwnc \tag{31}$$

Also in power conversion device 1*b* according to the fourth embodiment, if capacitor voltage Vc (average value) varies in the increasing direction in a certain arm 204, the modulation index correction signal of this arm is set to be higher than voltage command value Vdcc*, so that the output voltage command value of this arm 4 is decreased, thereby changing capacitor voltage Vc in the decreasing direction. Conversely, if capacitor voltage Vc (average value) varies in the decreasing direction, the modulation index correction signal is set to be lower than voltage command value Vdcc*, thereby changing capacitor voltage Vc in the increasing direction. In other words, modulation index correction signals Vdcupc, Vdcvpc, Vdcwpc, Vdcunc, Vdcvnc, Vdcwnc of individual arms 204 can be generated to compensate for an oscillation component of capacitor voltage Vc, that is, an oscillation component of stored energy of DC capacitor 15.

Therefore, output voltage command values Vupo, Vvpo, Vwpo, Vuno, Vvno, Vwno can be calculated with compensation for an oscillation component of stored energy of DC capacitor 15 by performing division by modulation index correction signals Vdcupc, Vdcvpc, Vdcwpc, Vdcunc, Vdcvnc, Vdcwnc having the same frequency component as the AC oscillation component (an integer multiple of the grid frequency) of capacitor voltage Vc, in accordance with equations (26) to (31).

Gate signal generating unit 310 computes output voltage command values Vupo*, Vvpo*, Vwpo*, Vuno*, Vvno*, Vwno* of converter cells 10, based on output voltage command values Vupo, Vvpo, Vwpo, Vuno, Vvno, Vwno of the positive electrode-side and negative electrode-side arms 204 of individual phases that are output from voltage command value computing unit 300, in the same manner as gate signal generating unit 110 in the first embodiment. Further, gate signal generating unit 310 generates a gate signal for controlling on/off drive of switching element 13 of each converter cell 10 by performing PWM control based on output voltage command values Vupo*, Vvpo*, Vwpo*, Vuno*, Vvno*, Vwno*, in the same manner as explained in FIG. 5.

Also in power conversion device 1*b* according to the fourth embodiment, each switching element 13 of each converter cell 10 is driven on/off in accordance with a gate signal from gate signal generating unit 310, whereby power conversion controlled as described above by converter control unit 207 is performed by power conversion unit 206.

In this way, in power conversion device 1*b* according to the fourth embodiment, in each of the positive electrode-side and negative electrode-side arms 204 of individual phases, an AC oscillation component of capacitor voltage Vc which causes variation in stored energy of DC capacitor 15 is extracted, and an output voltage command value of converter cell 10 of each arm 204 can be corrected to compensate for capacitor voltage variation due to the oscillation component, in the same manner as in the first embodiment. This increases the effect of suppressing variation of capacitor voltage Vc, that is, stored energy of DC capacitor 15 (power storage element) in a specific frequency component (an integer multiple of the grid frequency) produced in each arm 204, thereby suppressing harmonic current output from power conversion device 1*b*.

Fifth Embodiment

In a fifth embodiment, a modification of the configuration of modulation index correcting unit 290 in power conversion device 1*b* according to the fourth embodiment will be described. In a power conversion device according to the fifth embodiment, the configuration and operation is similar to that of the fourth embodiment except for modulation index correcting unit 290 and therefore a description will basically not be repeated.

In the fifth embodiment, the control of extracting the oscillation component based on power estimation for each arm 204 in the same manner as the second embodiment will be described.

Figure 12:
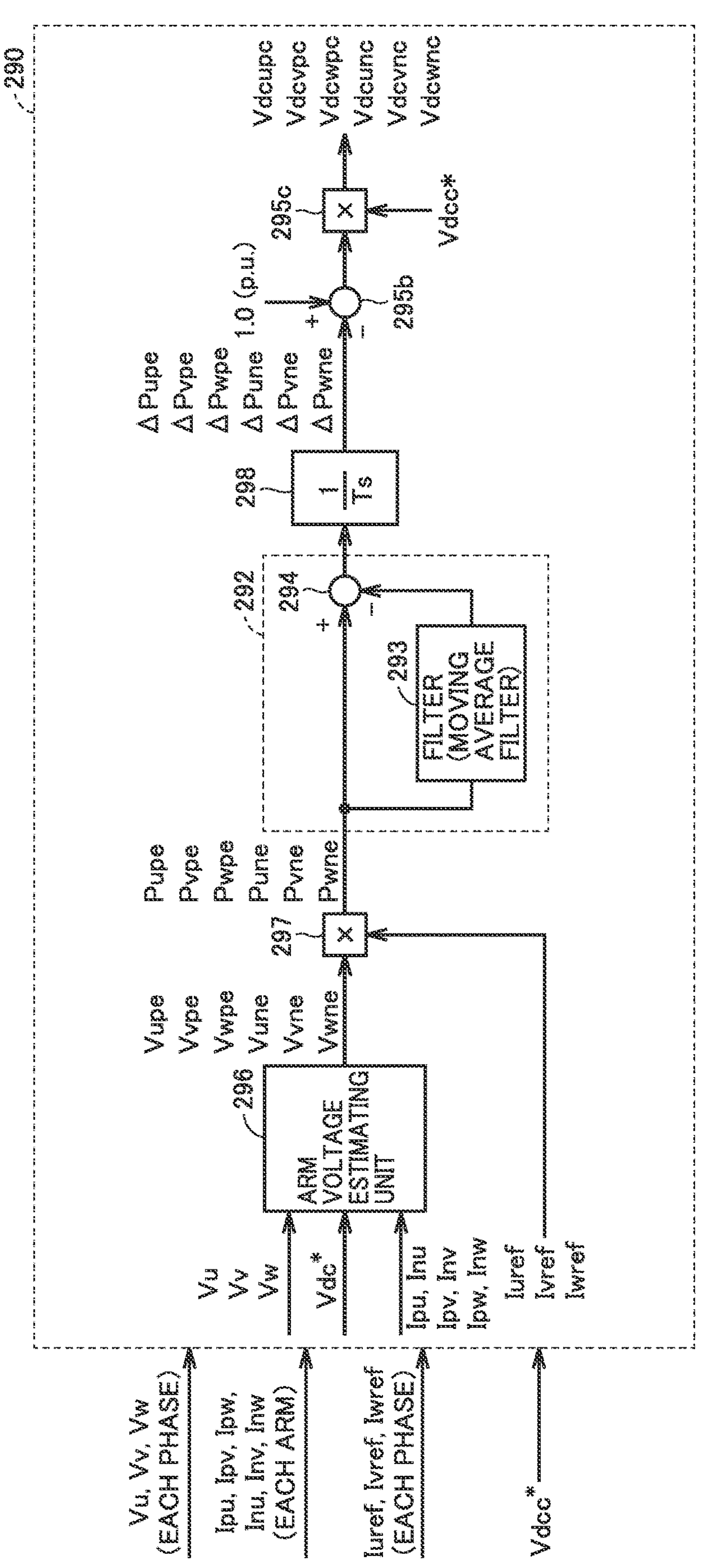
FIG. 12 is a block diagram illustrating an internal configuration example of a modulation index correcting unit in a power conversion device according to a fifth embodiment.

FIG. 12 shows a block diagram illustrating an internal configuration example of modulation index correcting unit 290 in a power conversion device according to the fifth embodiment.

In the fifth embodiment, as indicated by a dotted line in FIG. 9, modulation index correcting unit 290 receives grid AC voltages Vu, Vv, Vw detected by AC voltage detecting unit 20, arm currents Ipu, Ipv, Ipw, Inu, Inv, Inw detected by arm current detecting units 40, and output current command values Iuref, Ivref, Iwref output from output current control unit 70. Modulation index correcting unit 290 further receives voltage command value Vdcc* in the same manner as in the fourth embodiment.

As shown in FIG. 12, in the fifth embodiment, modulation index correcting unit 290 includes an arm voltage estimating unit 296, a power estimating unit 297, a frequency filter 292, an integrator 298, a subtractor 295*b*, and a multiplier 295*c*.

Arm voltage estimating unit 296 calculates arm voltage estimate values Vupe, Vvpe, Vwpe, Vune, Vvne, Vwne of individual arms 204 on the positive electrode side (p) and the negative electrode side (n) of U phase, V phase, and W phase, using grid AC voltages Vu, Vv, Vw, arm currents Ipu, Ipv, Ipw, Inu, Inv, Inw, inductance Larm of arm reactor 5, inductance Lac of interconnection transformer 3, and DC voltage command value Vdcc*, according to equations (32) to (37). In equations (32) to (37), ω means an angular frequency (ω=2π·f) synchronized with the grid AC voltage.

$$Vupe = -Vu + Vdcc*/2 - \omega\cdot(Lac + Larm/2)\cdot(Ipu - Inu) \tag{32}$$

$$Vvpe = -Vv + Vdcc*/2 - \omega\cdot(Lac + Larm/2)\cdot(Ipv - Inv) \tag{33}$$

$$Vwpe = -Vw + Vdcc*/2 - \omega\cdot(Lac + Larm/2)\cdot(Ipw - Inw) \tag{34}$$

$$Vune = Vu + Vdcc*/2 + \omega\cdot(Lac + Larm/2)\cdot(Ipu - Inu) \tag{35}$$

$$Vvne = Vv + Vdcc*/2 + \omega\cdot(Lac + Larm/2)\cdot(Ipv - Inv) \tag{36}$$

$$Vwne = Vw + Vdcc*/2 + \omega\cdot(Lac + Larm/2)\cdot(Ipw - Inw) \tag{37}$$

Power estimating unit 297 calculates arm power estimate values Pupe, Pvpe, Pwpe, Pune, Pvne, Pwne of individual arms 204, using arm voltage estimate values Vupe, Vvpe, Vwpe, Vune, Vvne, Vwne of individual arms 204 and output current command values Iuref, Ivref, Iwref of individual phases, according to equations (38) to (43). As divided by reference power (rated power) Pr, the unit of each arm power estimate value is [p.u] in the same manner as equations (14) to (16).

$$Pupe = (Vupe\cdot Iuref)/Pr \tag{38}$$

$$Pvpe = (Vvpe\cdot Ivref)/Pr \tag{39}$$

$$Pwpe = (Vwpe\cdot Iwref)/Pr \tag{40}$$

$$Pune = (Vune\cdot Iuref)/Pr \tag{41}$$

-continued $$Pvne = (Vvne \cdot Ivref)/Pr \tag{42}$$

$$Pwne = (Vwne \cdot Iwref)/Pr \tag{43}$$

Frequency filter 292 is configured in the same manner as in the fourth embodiment. Frequency filter 292 extracts an AC oscillation component included in arm power estimate values Pupe, Pvpe, Pwpe, Pune, Pvne, Pwne, preferably, an AC oscillation component including a frequency component of an integer multiple of the grid frequency. The oscillation component extracted from temporal change of arm power is input to integrator 298.

Integrator 298 outputs the time integrals of the oscillation components of arm power estimate values Pupe, Pvpe, Pwpe, Pune, Pvne, Pwne output from frequency filter 292, as arm power variation amounts ΔPupe, ΔPvpe, ΔPwpe, ΔPune, ΔPvne, ΔPwne. The integral time constant in integrator 298 is also set in the same manner as in integrator 98 in the second embodiment.

As shown in FIG. 9, since the direction from the positive electrode side to the negative electrode side is positive in arm currents Ipu, Ipv, Ipw, Inu, Inv, Inw, arm current having a positive value acts as charge current of DC capacitor 15 whereas arm current having a negative value acts as discharge current of DC capacitor 15.

Subtractor 295*b* can convert the AC variation components of arm power estimate values Pupe, Pvpe, Pwpe, Pune, Pvne, Pwne into AC variation components of capacitor voltage Vc by subtracting the output values of integrator 298 from 1.0 [p.u] indicating rating, in the same manner as subtractor 95*b* in the second embodiment.

Further, subtractor 295*c* calculates modulation index correction signals Vdcupc, Vdcvpc, Vdcwpc, Vdcunc, Vdcvnc, Vdcwnc of individual arms 204 in accordance with the following equations (44) to (49) by multiplying the outputs of individual arms 204 from subtractor 295*b* by voltage command value Vdcc*.

$$Vdcupc = (1.0 - \Delta Pupe) \cdot Vdcc^{*} \tag{44}$$

$$Vdcvpc = (1.0 - \Delta Pvpe) \cdot Vdcc^{*} \tag{45}$$

$$Vdcwpc = (1.0 - \Delta Pwpe) \cdot Vdcc^{*} \tag{46}$$

$$Vdcunc = (1.0 - \Delta Pune) \cdot Vdcc^{*} \tag{47}$$

$$Vdcvnc = (1.0 - \Delta Pvne) \cdot Vdcc^{*} \tag{48}$$

$$Vdcwnc = (1.0 - \Delta Pwne) \cdot Vdcc^{*} \tag{49}$$

According to equations (44) to (49), also in the fifth embodiment, variation in the increasing direction of arm power in the direction of discharging DC capacitor 15 acts such that the modulation index correction signal is set to be lower than voltage command value Vdcc*. Conversely, it is understood that variation in the decreasing direction of arm power acts such that the modulation index correction signal is set to be higher than voltage command value Vdcc*.

The calculated modulation index correction signals Vdcupc, Vdcvpc, Vdcwpc, Vdcunc, Vdcvnc, Vdcwnc are input to voltage command value computing unit 300 similar to that in the fourth embodiment and used for calculation of output voltage command values Vupo, Vvpo, Vwpo, Vuno, Vvno, Vwno of converter cells 10 in the positive electrode-side and negative electrode-side arms 204 of individual phases according to the above equations (26) to (31).

The calculated output voltage command values Vupo, Vvpo, Vwpo, Vuno, Vvno, Vwno are input to gate signal generating unit 310 similar to that in FIG. 9. Gate signal generating unit 310 generates a gate signal for controlling on/off drive of switching element 13 of each converter cell 10 by performing PWM control based on output voltage command values Vupo*, Vvpo*, Vwpo*, Vuno*, Vvno*, Vwno* computed from output voltage command values Vupo, Vvpo, Vwpo, Vuno, Vvno, Vwno from voltage command value computing unit 300, in the same manner as in the fourth embodiment.

Therefore, in the power conversion device according to the fifth embodiment, modulation index correcting unit 290 in power conversion device 1*b* in FIG. 9 has the internal configuration of FIG. 12, whereby an AC oscillation component of input/output power for each of the positive electrode-side and negative electrode-side arms 204 of each phase is extracted, and an output voltage command value of converter cell 10 in each arm 4 can be corrected to compensate for the variation component. With this configuration, an output voltage command value of each arm 204 can be generated to compensate for an oscillation component of stored energy of DC capacitor 15 (power storage element) in a specific frequency component (an integer multiple of the grid frequency) produced in each arm 204, in the same manner as in the fourth embodiment.

Therefore, even in the power conversion device according to the fifth embodiment, harmonic current output from power conversion device 1*b* can be suppressed by increasing the effect of suppressing oscillation in a specific frequency component (an integer multiple of the grid frequency) of stored energy of DC capacitor 15 produced in the positive electrode-side and negative electrode-side arms 204 of each phase, in the same manner in the fourth embodiment.

Sixth Embodiment

In a sixth embodiment, a control configuration for suppressing harmonic current even when load current is small in power conversion device 1*b* according to the fourth embodiment in the same manner as in the third embodiment will be described.

In the sixth embodiment, the configuration of circulating current control unit 280 and modulation index correcting unit 290 is changed from that of the fourth and fifth embodiments. In a power conversion device according to the sixth embodiment, the configuration and operation is similar to that of the fourth embodiment except for circulating current control unit 280 and modulation index correcting unit 290 and therefore a description will basically not be repeated.

Figure 13:
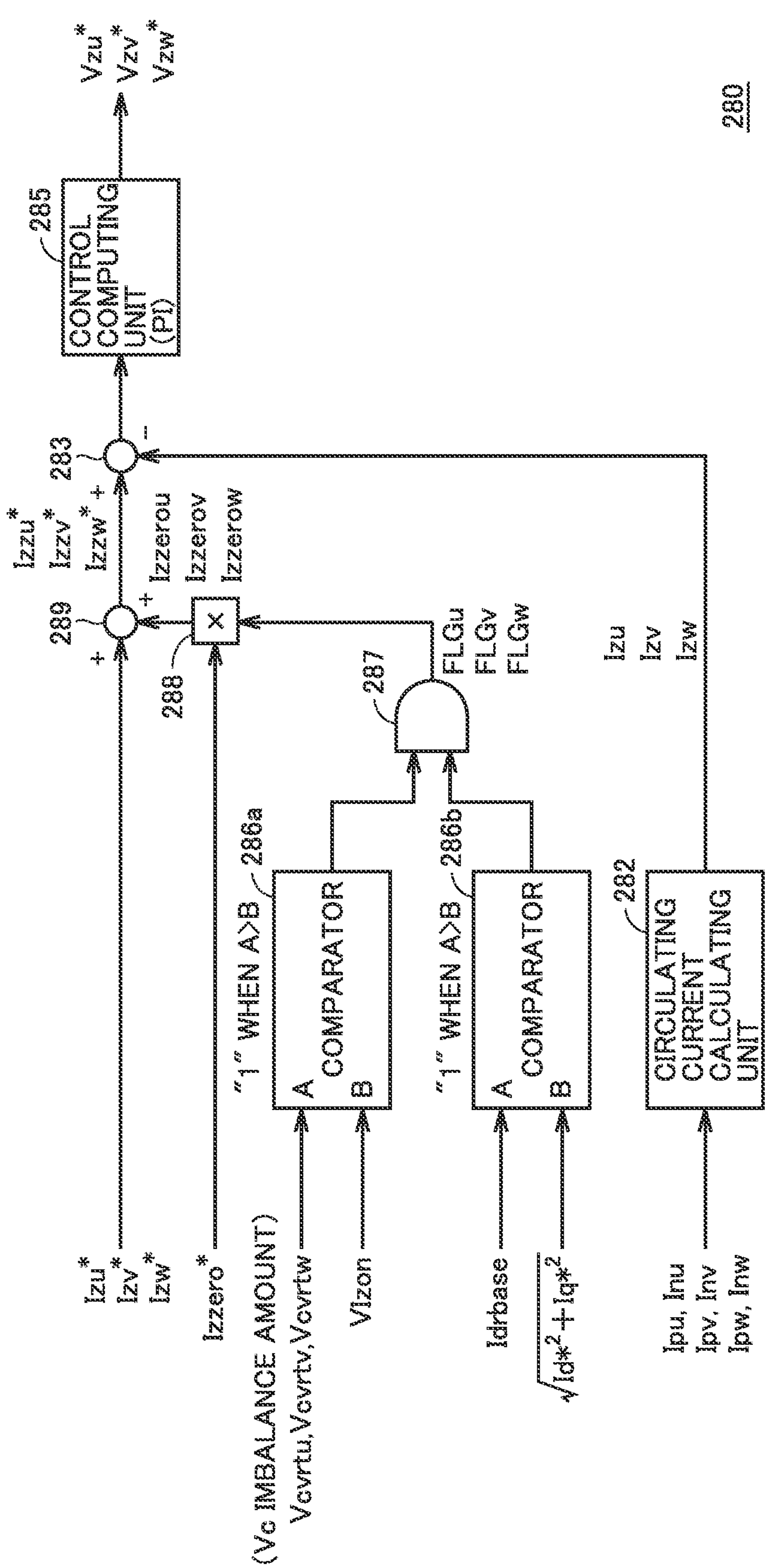
FIG. 13 is a block diagram illustrating an internal configuration example of a circulating current control unit in a power conversion device according to a sixth embodiment.

FIG. 13 shows a block diagram illustrating an internal configuration example of circulating current control unit 280 in a power conversion device according to the sixth embodiment.

As shown in FIG. 13, circulating current control unit 280 includes a circulating current calculating unit 282, a deviation computing unit 283, and a control computing unit 285, as well as comparators 286*a*, 286*b*, an AND gate 287, a multiplier 288, and an adder 289 for calculating a correction amount of a circulating current command value.

Circulating current calculating unit 282 calculates circulating currents Izu, Izv, Izw of individual phases from arm currents Ipu, Ipv, Ipw, Inu, Inv, Inw detected by arm current detecting units 40, in accordance with equations (23) to (25) explained in the fourth embodiment.

Adder 289 calculates corrected circulating current command values Izzu*, Izzv*, Izzw* (Izzu*=Izu*+Izzerou, Izzv*=Izv*+Izzerov, Izzw*−Izw*+Izzerow) by adding circulating current command values Izu*, Izv*, Izw* of individual phases from voltage balance control unit 220 to correction amounts Izzerou, Izzerov, Izzerow of individual phases output from multiplier 288.

Deviation computing unit 283 calculates current deviations ΔIzu, ΔIzv, ΔIzw by subtracting circulating currents Izu, Izv, Izw output by circulating current calculating unit 282 from circulating current command values Izzu*, Izzv*, Izzw* output by adder 289. Control computing unit 285 calculates circulating voltage command values Vzu*, Vzv*, Vzw* for bringing each of current deviations ΔIzu, ΔIzv, ΔIzw to zero, that is, for controlling such that circulating currents Izu, Izv, Izw follow circulating current command values Izzu*, Izzv*, Izzw* in accordance with predetermined control computation such as PI (proportional integral) control.

Therefore, in circulating current control unit 280 shown in FIG. 13, when correction amount Izzerou=Izzerov=Izzerow=0, circulating current command values Izu*, Izv*, Izw* of individual phases from voltage balance control unit 220 are equal to circulating current command values Izzu*, Izzv*, Izzw* output by adder 289, and in this case, the operation of circulating current control unit 280 is similar to that described in the fourth embodiment.

The operation of comparators 286*a*, 286*b*, AND gate 287, multiplier 288, and adder 289 added in the sixth embodiment will now be described.

Comparator 286*a* receives evaluation values Vcvrtu, Vcvrtv, Vcvrtw of imbalance amounts of capacitor voltages Vc of respective converter cells 10 of U phase, V phase, and W phase, and a predetermined first preset value VIzon. For each of evaluation values Vcvrtu, Vcvrtv, Vcvrtw, (Vcmax−Vcave) and Vcvrt−(Vcave−Vcmin) can be set using average value Vcave, maximum value Vcmax, and minimum value Vcmin of capacitor voltages Vc of (2·N) converter cells 10 of each phase.

Comparator 286*a* outputs "1" or "0" in accordance with a comparison result between respective evaluation values Vcvrtu, Vcvrtv, Vcvrtw of U phase, V phase, W phase and common first preset value VIzon. For example, when at least one of two conditions: (Vcmax−Vcave)>VIzon and (Vcave−Vcmin)>VIzon is satisfied, the output signal of the corresponding phase is set to "1". On the other hand, comparator 286*a* sets an output signal to "0" for a phase in which neither of the two conditions is satisfied. In other words, comparator 286*a* is configured to detect that the imbalance in capacitor voltage Vc of converter cells 10 in the same phase is large, for each of U phase, V phase, and W phase.

Comparator 286*b* receives $\sqrt{(Id^{*2}+Iq^{*2})}$ indicating the magnitude of the vector sum of reactive current command value Id* and active current command value Iq*, and a predetermined second preset value Idrbase. Comparator 286*b* outputs "1" when $\sqrt{(Id^{*2}+Iq^{*2})}<Idrbase$ and outputs "0" when $\sqrt{(Id^{*2}+Iq^{*2})}\geq Idrbase$. In other words, comparator 286*b* is configured to detect that the load current (output current to AC power grid 2) of power conversion device 1*b* is small when the current value $\sqrt{(Id^{*2}+Iq^{*2})}$ is smaller than a preset value. An output signal of comparator 286*b* is common to U phase, V phase, and W phase.

AND gate 287 outputs a logical product (AND) operation result of an output value of each phase of comparator 286*a* and an output value of comparator 86*b*. Multiplier 288 outputs respective multiplication values of output values FLGu, FLGv, FLGw (1 or 0) of U phase, V phase, and W phase from AND gate 287 and a preset increase amount Izzero* of a circulating current command value, as correction amounts Izzerou, Izzerov, Izzerow, to adder 289 (Izzerou−FLGu·Izzero*, Izzerov=FLGv·Izzero*, Izzerow=FLGw·Izzero*). Increase amount Izzero* is common to U phase, V phase, and W phase.

Therefore, when load current is small, each of correction amounts Izzerou, Izzerov, Izzerow is set to Izzero* for a phase with a large variation in capacitor voltage Vc and is set to zero for the other phases. When output current (load current) of power conversion device 1*b* is large, each of correction amounts Izzerou, Izzerov, Izzerow is set to zero irrespective of the imbalance amount of capacitor voltage Vc.

As a result, when output current (load current) of power conversion device 1*b* is small, if there occurs a phase with a large imbalance in capacitor voltage Vc, circulating current command value Izzu*, Izzv*, Izzw* can be set by increasing normal circulating current command value Izu*, Izv*, Izw* by Izzero* in this phase. On the other hand, for a phase in which correction amount Izzerou, Izzerov, Izzerow is zero, circulating current Izu, Izv, Izw is controlled in accordance with circulating current command value Izu*, Izv*, Izw* from voltage balance control unit 220, in the same manner as in the fourth embodiment.

With this configuration, in the power conversion device in the sixth embodiment, when load current is small and the imbalance in capacitor voltage Vc becomes large ("first state") in any of U phase, V phase, and W phase, circulating current of such a phase is increased compared to the other state ("second state"), thereby ensuring the change amount of capacitor voltage Vc.

In the sixth embodiment, as indicated by a dotted line in FIG. 9, circulating current command values Izzu*, Izzw*, Izzw* reflecting correction amounts Izzerou, Izzerov, Izzerow are further output from circulating current control unit 280, in addition to circulating voltage command values Vzu*, Vzv*, Vzw*.

Figure 14:
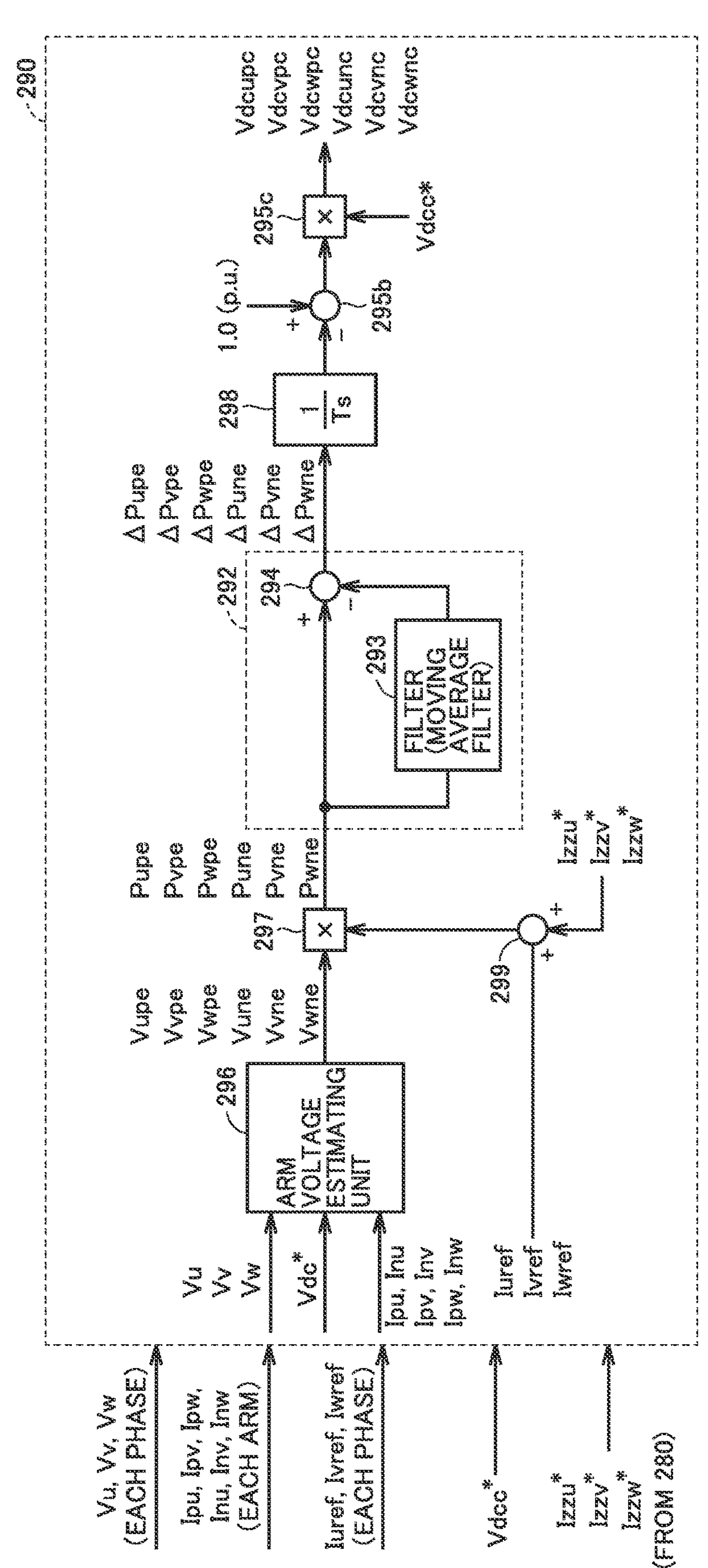
FIG. 14 is a block diagram illustrating an internal configuration example of a modulation index correcting unit in the power conversion device according to the sixth embodiment.

FIG. 14 shows a block diagram illustrating an internal configuration example of modulation index correcting unit 290 in the power conversion device according to the sixth embodiment.

As shown in FIG. 14, modulation index correcting unit 290 according to the sixth embodiment further includes an adder 299 in addition to the configuration according to the fifth embodiment shown in FIG. 12.

Adder 299 adds correction amounts Izzu*, Izzv*, Izzw* of the circulating current command values from circulating current control unit 280 to output current command values Iuref, Ivref, Iwref of individual phases.

Then, power estimating unit 297 calculates arm power estimate values Pupe, Pvpe, Pwpe, Pune, Pvne, Pwne, according to the following equations (50) to (55), using arm voltage estimate values Vue, Vve, Vwe from arm voltage estimating unit 296 similar to that in the fifth embodiment and output values of adder 299.

$$Pupe = (Vupe\cdot(Iuref + Izzu*))/Pr \tag{50}$$

$$Pvpe = (Vvpe\cdot(Ivref + Izzv*))/Pr \tag{51}$$

$$Pwpe = (Vwpe\cdot(Iwref + Izzw*))/Pr \tag{52}$$

$$Pune = (Vune\cdot(Iuref + Izzu*))/Pr \tag{53}$$

-continued $$Pvne = (Vvne \cdot (Ivref + Izzv*))/Pr \quad (54)$$

$$Pwne = (Vwne \cdot (Iwref + Izzw*))/Pr \quad (55)$$

Equations (50) to (55) are obtained by replacing output current command values Iuref, Ivref, Iwref by (Iuref+Izzu*), (Ivref+Izzv*), (Iwref+Izzw*) in equations (38) to (43).

With this configuration, when load current is small, unlike when load current is large, an unignorable ratio of circulating current to arm current can be coped with, in the same manner as in the third embodiment. In other words, arm power estimate values Pupe, Pvpe, Pwpe, Pune, Pvne, Pwne can be calculated such that the increase amount (0 or Izzero*) of the circulating current command value by circulating current control unit 280 is reflected. The subsequent operation of frequency filter 292, integrator 298, adder 295*b*, and multiplier 295*c* is similar to that in the fifth embodiment (FIG. 12).

Therefore, in a normal state (when Izzerou, Izzreov, Izzerow are zero), modulation index correction signals Vdcupc, Vdcvpc, Vdcwpc, Vdcunc, Vdcvnc, Vdcwnc for individual arms 204 are calculated, in the same manner as in the fifth embodiment. Further, when the circulating current command value is increased in circulating current control unit 280, the modulation index correction signal can be generated by power estimation computation that reflects the increase amount. Since the fifth embodiment is premised on that load current is large, it is less necessary to reflect the circulating current command value in calculation of arm power estimate values Pue, Pve, Pwe, in the same manner as in the second embodiment.

As a result, in the power conversion device according to the sixth embodiment, when load current is small in any of the phases, if the imbalance in stored energy of DC capacitor 15, that is, capacitor voltage Vc increases, circulating current is increased in such a phase and thereby arm current is increased without outputting current to the grid side, thereby ensuring the control ability of changing capacitor voltage Vc.

Further, since the arm power estimate value can be determined accurately such that the increase of arm current by circulating current control is reflected, harmonic current output from power conversion device 1*b* can be suppressed by increasing the effect of suppressing oscillation in a specific frequency component (an integer multiple of the grid frequency) of stored energy of DC capacitor 15 produced in each arm 204, in the same manner as in the fifth embodiment.

Alternatively, a modification can be contemplated, in which only circulating current control unit 280 is replaced by the configuration of the sixth embodiment (FIG. 13) in the configuration of the fourth embodiment, and modulation index correcting unit 290 remains the same as the configuration of the fourth embodiment (FIG. 11). Also in this modification, in addition to the effect in the foregoing fourth embodiment, the effect of suppressing output harmonic current can be achieved by ensuring the control ability of changing capacitor voltage Vc even when load current is small.

In the fifth and sixth embodiments, an estimate value obtained by computation with a voltage estimate value and a current command value is used for the arm power for each arm 204, in the same manner as in the second and third embodiments. However, the arm power may be determined by other methods. For example, a measurement value (detection value) may be directly used for at least one of voltage and current, and a voltage command value may be used.

In the fourth to sixth embodiments, different methods of calculating modulation index correction signals Vdcupc, Vdcvpc, Vdcwpc, Vdcunc, Vdcvnc, Vdcwnc in power conversion device 1*b* (power conversion unit 206) in FIG. 9 have been described. The calculations of modulation index correction signals according to the fourth to sixth embodiments can be selectively used for control of power conversion unit 206. Alternatively, the calculations of modulation index correction signals according to the fourth to sixth embodiments may be applied in a switching manner depending on the operating conditions of power conversion device 1*b*.

Embodiments disclosed here should be understood as being illustrative rather than being limitative in all respects. The technical scope of the present disclosure is shown not in the foregoing description but in the claims, and it is intended that all modifications that come within the meaning and range of equivalence to the claims are embraced here.

REFERENCE SIGNS LIST

1*a*, 1*b* power conversion device, 2 AC power grid, 3 interconnection transformer, 4, 204 arm, 5 arm reactor, 6, 206 power conversion unit, 6*n*, 6*p* DC line, 7, 207 converter control unit, 10 converter cell, 11*a*, 11*b* series unit, 13 switching element, 14 diode element, 15 DC capacitor, 20 AC voltage detecting unit, 30 output current detecting unit, 40 arm current detecting unit, 50 DC capacitor voltage detecting unit, 51, 52 DC voltage detecting unit, 60, 220 voltage balance control unit, 61, 100, 300 voltage command value computing unit, 62 each phase voltage representative value calculating unit, 63, 92, 292 frequency filter, 64, 83, 283 deviation computing unit, 65 arm current command value calculating unit, 70 output current control unit, 80, 280 circulating current control unit, 81 circulating current command value computing unit, 82, 282 circulating current calculating unit, 85, 285 control computing unit, 90, 290 modulation index correcting unit, 91, 291 average value computing unit, 93, 293 moving average filter, 96, 296 arm voltage estimating unit, 97, 297 power estimating unit, 98, 298 integrator, 110, 310 gate signal generating unit, 222 phase balance control unit, 224 positive/negative balance control unit, 270 current control unit, CS carrier signal, Id reactive current, Id* reactive current command value, Iq active current, Iq* active current command value, Iz, Izu, Izv, Izw circulating current, Iz*, Izu*, Izv*, Izw*, Izzu*, Izzv*, Izzw* circulating current command value, Iu, Iv, Iw AC output current, Iuref, Ivref, Iwref output current command value, Iuv, Ivw, Iwu, Ipu, Inu, Ipv, Inv, Ipw, Inw arm current, Na, Nb connection node, Nu, Nv, Nw AC end, Pue, Pune, Pupe, Pve, Pvne, Pvpe, Pwe, Pwne, Pwpe arm power estimate value, Vc capacitor voltage, Vdc*, Vdcc* voltage command value, Vdcuc, Vdcvc, Vdcwc, Vdcupc, Vdcvpc, Vdcwpc, Vdcunc, Vdcvnc, Vdcwnc modulation index correction signal, Vu, Vv, Vw grid AC voltage, Vu*, Vv*, Vw* phase voltage command value, Vue, Vune, Vupe, Vve, Vvne, Vvpe, Vwe, Vwne, Vwpe arm voltage estimate value, Vuo, Vuno, Vupo, Vvo, Vvno, Vvpo, Vwo, Vwno, Vwpo output voltage command value, Vz* zero phase voltage command value, Vzu*, Vsv*, Vzw* circulating voltage command value, Vzpnu*, Vzpnv*, Vzpnw* voltage command value for positive and negative balance.

The invention claimed is:

1. A power conversion device connected to an AC power grid, comprising:

a power conversion unit including at least one arm having a plurality of converter cells connected to each other in cascade; and a converter control unit to control the power conversion unit, each of the converter cells including a pair of input/output terminals, a plurality of switching elements, and a power storage element electrically connected to the input/output terminals through the switching elements, the converter control unit including a voltage command value computing unit to compute an output voltage command value for each of the at least one arm, and a gate signal generating unit to generate an on/off control signal of each of the switching elements of each of the converter cells of each the arm in accordance with the output voltage command value, wherein the voltage command value computing unit generates the output voltage command value with compensation for an AC oscillation component, extracted for each arm, of a predetermined frequency of stored energy of the power storage elements of the converter cells included in the arm, wherein the AC oscillation component of stored energy of the power storage elements is extracted from temporal change for each arm in average value of voltage detection values of the power storage elements of the converter cells included in the arm, or it is extracted from temporal change in arm power estimate value obtained by multiplying an estimate value of the arm voltage and a command value of the arm current, wherein the power conversion device is connected in parallel with the AC power grid, the power conversion unit has three phase arms in delta connection, and connection ends of the three phase arms are respectively connected to three phases of the AC power grid through a rector component, wherein the converter control unit further includes an output current control unit to generate a first voltage command value for each phase for controlling an output current of the power conversion device in accordance with a command value, a circulating current control unit to generate a second voltage command value for controlling circulating current that circulates in the power conversion device to pass through the arms of the three phases, such that voltages of the power storage elements of all the converter cells in the power conversion unit are balanced, and a modulation index correcting unit to extract the AC oscillation component for each arm and generate a modulation index correction signal having a frequency component in accordance with the AC oscillation component, the voltage command value computing unit generates the output voltage command value to compensate for the AC oscillation component of stored energy based on the first voltage command value, the second voltage command value, and the modulation index correction signal, the circulating current control unit calculates a command value of the circulating current for balancing voltages of the storage elements of all the converter cells in the power conversion unit and computes the second voltage command value to control the circulating current in accordance with the command value, and the command value of the circulating current is increased in a first state in which a command value of the output current of the power conversion device is smaller than a first preset value and an imbalance amount in voltage of the power storage elements of the converter cells of all the three phases is greater than a second preset value, compared to a second state that is not the first state.

2. The power conversion device according to claim 1, wherein the AC oscillation component of stored energy of the power storage elements is extracted from temporal change for each arm in arm power estimate value in accordance with multiplication of an estimate value of arm voltage applied to the converter cells included in the arm and a command value of arm current passing through the arm.

3. The power conversion device according to claim 1, wherein the AC oscillation component of stored energy of the power storage elements is extracted from temporal change for each arm in arm power estimate value in accordance with multiplication of an estimate value of arm voltage applied to the arm and a command value of arm current passing through the arm, and the command value of arm current is determined in accordance with a sum of a current command value for each phase determined from the command value of the output current and the command value of the circulating current.

4. A power conversion device connected to an AC power grid, comprising:

a power conversion unit including at least one arm having a plurality of converter cells connected to each other in cascade; and a converter control unit to control the power conversion unit, each of the converter cells including a pair of input/output terminals, a plurality of switching elements, and a power storage element electrically connected to the input/output terminals through the switching elements, the converter control unit including a voltage command value computing unit to compute an output voltage command value for each of the at least one arm, and a gate signal generating unit to generate an on/off control signal of each of the switching elements of each of the converter cells of each the arm in accordance with the output voltage command value, wherein the voltage command value computing unit generates the output voltage command value with compensation for an AC oscillation component, extracted for each arm, of a predetermined frequency of stored energy of the power storage elements of the converter cells included in the arm, wherein the AC oscillation component of stored energy of the power storage elements is extracted from temporal change for each arm in average value of voltage detection values of the power storage elements of the converter cells included in the arm, or it is extracted from temporal change in arm power estimate value obtained by multiplying an estimate value of the arm voltage and a command value of the arm current, wherein the power conversion device is connected between DC lines on a positive electrode side and a negative electrode side and the AC power grid, and for each of three phases of the AC power grid, the power conversion unit includes the arms connected between an AC end connected to the AC power grid through a reactor component and the DC line on the positive electrode side and between the AC end and the DC line on the negative electrode side, wherein the converter control unit further includes an output current control unit to generate a first voltage command value for each phase for controlling an output current of the power conversion device in accordance with a command value, a circulating current control unit to generate a second voltage command value for each phase for controlling circulating current of each phase that circulates in the power conversion device to pass through the arms on the positive electrode side and the negative electrode side in each of the phases, such that voltages of the power storage elements of the converter cells in the phase are balanced in each of the phases, a voltage balance control unit to generate a third voltage command value for each phase for balancing voltages of the power storage elements between the converter cells in the arm on the positive electrode side and the converter cells in the arm on the negative electrode side in each of the phases, and a modulation index correcting unit to extract the AC oscillation component for each arm and generate a modulation index correction signal having a frequency component in accordance with the AC oscillation component, the voltage command value computing unit generates the output voltage command value for each arm to compensate for the AC oscillation component of stored energy, based on the first voltage command value, the second voltage command value, the third voltage command value, a fourth voltage command value that is a command value of DC voltage applied to each of the arms, and the modulation index correction signal, and the first voltage command value and the third voltage command value are reflected in the output voltage command value, with polarities opposite to each other between the arm on the positive electrode side and the arm on the negative electrode side in each of the phases, wherein in each of the phases, in order to balance voltages of the power storage elements of the converter cells in the phase, the circulating current control unit calculates a command value of the circulating current for each phase and computes the second voltage command value for each phase to control the circulating current in accordance with the command value, and the command value of the circulating current for each phase is increased in a first state in which a command value of the output current of the power conversion device is smaller than a first preset value and an imbalance amount in voltage of the power storage elements of the converter cells in the phase is greater than a second preset value, compared to a second state that is not the first state.

5. The power conversion device according to claim 4, wherein the predetermined frequency includes a frequency of an integer multiple of a grid frequency of the AC power grid.

6. The power conversion device according to claim 4, wherein the AC oscillation component of stored energy of the power storage elements is extracted from temporal change for each arm in arm power estimate value in accordance with multiplication of an estimate of arm voltage applied to the converter cells included in the arm and a command value of arm current set for each phase corresponding to the arm.

7. The power conversion device according to claim 4, wherein the AC oscillation component of stored energy of the power storage elements is extracted from temporal change for each arm in arm power estimate value in accordance with multiplication of an estimate value of arm voltage applied to the converter cells included in the arm and a command value of arm current set for each phase corresponding to the arm, and the command value of arm current is determined in accordance with a sum of a current command value for each phase determined from the command value of the output current and the command value of the circulating current for each phase.

8. The power conversion device according to claim 1, wherein the predetermined frequency includes a frequency of an integer multiple of a grid frequency of the AC power grid.

* * * * *